US008495746B2

(12) United States Patent
Fissel et al.

(10) Patent No.: US 8,495,746 B2
(45) Date of Patent: Jul. 23, 2013

(54) APPARATUSES, METHODS AND SYSTEMS OF AN APPLICATION SECURITY MANAGEMENT PLATFORM

(75) Inventors: Michael Scott Fissel, Little Elm, TX (US); Scott Allen Hurst, Ft Worth, TX (US); David R Grantges, Clearwater, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 586 days.

(21) Appl. No.: 12/642,712

(22) Filed: Dec. 18, 2009

(65) Prior Publication Data
US 2011/0154498 A1    Jun. 23, 2011

(51) Int. Cl.
*G06F 11/00*    (2006.01)
(52) U.S. Cl.
USPC ...... 726/25; 726/2; 726/23; 726/24; 713/152; 709/229
(58) Field of Classification Search
USPC ................ 726/2, 23–25; 713/152; 709/229
See application file for complete search history.

(56) References Cited

U.S. PATENT DOCUMENTS

| 7,480,715 | B1 * | 1/2009 | Barker et al. ................. 709/224 |
| 7,945,683 | B1 * | 5/2011 | Ambrose et al. .............. 709/228 |
| 2006/0022048 | A1 * | 2/2006 | Johnson ..................... 235/462.1 |
| 2007/0220268 | A1 * | 9/2007 | Krishnaprasad et al. ..... 713/182 |
| 2008/0065646 | A1 * | 3/2008 | Zhang et al. ................... 707/10 |
| 2009/0192969 | A1 * | 7/2009 | Arthursson et al. ............ 706/47 |

OTHER PUBLICATIONS

Kaise, A Databank of Antarctic Surface Temperature and Pressure Data (NDP-032), Oct. 2001.*

* cited by examiner

*Primary Examiner* — April Shan
*Assistant Examiner* — Joseph Pan

(57) ABSTRACT

This disclosure details the implementation of apparatuses, methods and systems of an application security management platform (hereinafter, "ASMP"). ASMP systems may, in one embodiment, implement a live platform on a computerized system, whereby the platform may receive security data associated with a running application from multiple security tacking systems, evaluate the security performance of the application, generate an application security summary report for review and manage review processes for security professionals.

21 Claims, 39 Drawing Sheets

New Application Request

Requestor Information:

Requestor: Ken Smith    Email: ks@email.com    Telephone: 123-456-7890

Application Phases:

Request to establish a new Application ID or SFG30 ID. This form is used to request a new 3 character Application ID or SFG30 ID. The Application ID can be seen in CAD or the SPG30 Systems Practice. All new Applications will require a complete Business Impact Analysis (BIA) survey to assess the criticality of the system to Verizon. Please complete the BIA survey at the following site: _____

Prerequisites : All new applications must go through a Design Review. Please contact Louis Reel at (972) 507-1157 if you require additional information.

Current Life Cycle Phase :                              Select
Current Design Review Phase :                   Select
Person conducting your Design Review :   Select If you are not having a Design Review, please explain why you need an Application ID :

Application Information:

Application Name :

Complete application Base address :

Application Integrity Rating for Reporting :

Application Priority :                                          Select

Score Manager

Project | App Global | Contacts | CAD | S.A.TS | dCATs | X-Check | Systems | Software | Review | PFSE | Portfolio-Certified Items labeled in Blue denote points PER FINDING.

S.A.TS Acronym not blank: 0
S.A.TS ID not blank: 0

S.A.TS Acronym blank: 1
S.A.TS ID blank: 1

Score Manager

| Project | Contacts | CAD | SATS | dCATS | X-Check | | | |
|---------|----------|-----|------|-------|---------|--|--|--|
| App Global | Systems | Software | | RFSE | PortfolioCertified | | | |

Items labeled in Blue denote points PER FINDING.

| | | | |
|---|---|---|---|
| Approved: 20 | Review Info Exists - Yes: 0 | | Review Info Exists - No: 7 |
| | Pending Approval: 7 | | Approved Expired: 7 |
| | Questionnaire Approved: 0 | Other Statuses: 0 | |
| In-Review: 7 | In-Progress: 10 | Pending Approval: 3 | |
| | | | No Questionnaire: 13 |
| Valid Clean: 0 | Valid Low: 3 | | Valid Mid: 7 |
| Valid High: 10 | Expired Clean: 2 | | Expired Low: 5 |
| Expired Mid: 8 | Expired High: 12 | | No AppScan: 13 |
| Cleared Port Scan: 0 | Failed Port Scan: 1 | | No Port Scan: 10 |
| Multiple Approved Reviews - Yes: -10 | | | Multiple Approved Reviews - No: 8 |
| New App - No: 0 | | | New App - Yes: 3 |
| TAP Jeopardy Not Assigned: 0 | | | TAP Jeopardy Assigned: 7 |
| Jeopardies Exceptions - No: 0 | | | Jeopardies Exceptions - Yes: 2 |
| Questionnaire Info Exists - Yes: 0 | | | Questionnaire Info Exists - No: 7 |

Score Manager

| Project | App Global | CAD | SATS | dCATs | X-Check |
|---------|-----------|-----|------|-------|---------|
| Contracts | Systems | Software | Review | RFSE | Portfolio Certified |

What is the Confidentiality of the data being transported or stored by this project?
Not Answered: 10   Unrestricted: 0   Proprietary: 10   Restricted: 20   Highly Restricted: 30

Has there been an approved "certified" security review in the past 24 months?
Yes: -10   No: 0   Not Answered: 10

Does app have external internet interface?
No: 0   Not Answered: 10   Yes: 30

Does the application store or transport any CPI-303 data? (SSH, PII, SPI, PCI)
No: 0   Not Answered: 10   Yes: 30

Will this application be deployed on the customer premises?
No: 0   Not Answered: 10   Yes: 30

What is the mission critical status of the application?
Not Answered: 10   BC: 10   MC: 20

What is the BIA?
0-15: 0   16-35: 10   >35: 20   Not Answered: 10

Are any components of the application being developed, administered or supported by offshore groups?
No: 0   Not Answered: 5   Yes: 15

FIGURE 6M

Application Risk Dashboard

Applications

| Portfolio | All | 0-25 | 26-50 | 51-75 | 76-99 | 100 High Risk Systems | Portfolio Action Required | Certified Renews Required |
|---|---|---|---|---|---|---|---|---|
| IT Finance | 71 | 0 | 0 | 0 | 4 | 57 | 57 | 4 |
| IT Human Resources and Payroll Systems | 70 | 0 | 1 | 1 | 12 | 56 | 56 | 0 |
| IT Intranet | 24 | 0 | 0 | 1 | 8 | 14 | 14 | 1 |
| IT Planning Services | 4 | 0 | 0 | 0 | 2 | 2 | 2 | 0 |
| IT Solution Design, Real Estate, Supply Chain | 26 | 0 | 0 | 2 | 5 | 19 | 19 | 2 |
| IT Technology Planning and Implementation Support | 38 | 0 | 1 | 2 | 9 | 26 | 26 | 2 |
| IT VCB | 11 | 0 | 0 | 1 | 9 | 1 | 1 | 0 |
| IT Web Technology-Services Organization | 19 | 0 | 1 | 0 | 2 | 16 | 16 | 0 |
| Services Organization (Non-IT) | 1 | 0 | 0 | 0 | 0 | 1 | 1 | 0 |
| Business Product Line Management | 6 | 0 | 0 | 1 | 0 | 1 | 1 | 0 |
| IT Business Development and Emerging Services | 14 | 0 | 1 | 0 | 0 | 13 | 13 | 0 |
| IT Network Engineering and Provisioning | 263 | 0 | 7 | 2 | 5 | 230 | 248 | 5 |
| IT Network Service Assurance | 314 | 0 | 7 | 5 | 12 | 257 | 290 | 27 |
| IT Product Development | 143 | 0 | 6 | 5 | 10 | 116 | 127 | 8 |
| IT Production Support and Testing | 95 | 0 | 7 | 1 | 6 | 81 | 81 | 0 |
| IT Sales Support and Billing Systems | 419 | 0 | 7 | 0 | 3 | 405 | 401 | 4 |
| IT Sales, Care, and Ordering | 151 | 0 | 5 | 1 | 5 | 128 | 138 | 9 |
| IT Verizon Partner Solutions | 60 | 0 | 1 | 1 | 6 | 47 | 31 | 32 |
| Channel Marketing | 1 | 0 | 0 | 0 | 1 | 1 | 1 | 0 |
| Corporate Finance | 2 | 1 | 0 | 0 | 0 | 1 | 1 | 0 |
| Corporate Legal | 3 | 0 | 0 | 0 | 0 | 3 | 3 | 0 |
| Human Resources | 1 | 0 | 1 | 0 | 0 | 1 | 1 | 0 |
| IT Architecture & eServices | 20 | 1 | 1 | 7 | 10 | 10 | 10 | 6 |
| IT Customer Care | 134 | 0 | 2 | 1 | 10 | 108 | 85 | 23 |
| IT Customer Experience | 12 | 1 | 0 | 1 | 0 | 8 | 8 | 1 |
| IT End-User Support, Desktop & Messaging Tower | 25 | 0 | 1 | 1 | 6 | 17 | 16 | 1 |
| IT Global Operations | 8 | 0 | 0 | 0 | 0 | 8 | 8 | 0 |
| IT Mainframe & Data Center Ops Tower | 3 | 0 | 0 | 0 | 1 | 1 | 1 | 0 |
| IT Network & Information Security Tower | 17 | 1 | 0 | 0 | 0 | 10 | 10 | 0 |

FIGURE 7C

Application Detail: BF6V - VDSI_EP

| Score Summary 79 | Global Score | CAD BF6V | SATS 19383 | iHATs: BF6 | Review: 939 | X Check | RFSE N/A |
|---|---|---|---|---|---|---|---|

Project: 694 | Project Contacts | Project Systems | Project Software

Application Name: VDSI_EP
Application Description: EMPLOYEE PROFILE (VDS MDM)
SIP320 Description: EMPLOYEE PROFILE (VDS MDM/SRVR/PROD ACCESS/V
System ID: BF6
App Category: Resource Mgmt
Activated Date: 11/19/2007
Criticality: Non-Critical
FIOS Application: No
Owning Entity: IT
Portfolio CIO: Joe White
Portfolio President: Tom Smith
Portfolio EVP: N/A
Executive Director: N/A
Manager: Joe White

VAST Acronym: BF6
VAST ID: N/A
ProjectID: BF6
App Disposition: Active
Inactivated Date: N/A
BIA Score: 9
Broadband: No
Line of Business: SERVICES OPERATIONS IT

Portfolio VP: N/A
Portfolio SVP: FAIRFAX01 BB9AJ44M
Director: saunderssauce.ssauces
Application Owner: SUSPKAMAR X MITRA

Application Comments: Employees create/update their profiles (like server access production data access etc.). As a part of security compliance all employees have to enter these details in the tool and it should be approved by the supervisor. Once it is verified the data is used for all the Intranet tools.

Has Data Recovery Plan: No
DR Plan Comments: No disaster recovery comments provided Score Details

Application Detail: BF6V - VDSI_EP

| Score Summary | 79 | Global Score | 6 | Project Contacts | 6 | CAD BF6V | 6 | S.A.TS 19393 | 6 | IR.&T&I.386 | 6 | Review: 930 | 6 | X Check | 6 | BFSE-R/A | 6 |

| Project: 604 | 40 | Project Software | 0 | Project Systems | 0 |

SP320_ProjectID: BF6         SP320_SystemID: BF6
Data Group: IT - Network Systems         LOB: INFORMATION TECHNOLOGY
Mission Critical: No         Special Privilege: No
Confidentiality: Proprietary         Integrity: Contended
Availability: Standard         Application Status: Active
Admin Group Name: VDSI Intranet         Admin Group Manager - Phone: Santanu Satapathy - 8528978055

| Application | Owner | Primary Trustee | Active Trustee |
|---|---|---|---|
| VDSI_EMPLOYEE PROFILE (OS 3x30) | Senna Brailey | | |

Score Details:
Exist: Yes: 0

FIGURE 7G

Application Detail: BF6V - VDS1_EP

| Score Summary 70 | Global Score | Project Contacts | CAD BF6V | SATS 19383 | dCATs: BF6 | X Check |
| --- | --- | --- | --- | --- | --- | --- |
| Project Info | Project Contacts | Project Systems | Project Software | Reviews: 9,99 | NFSE: N/A | |

Project: EmployeeProfile
Description: It collects all the information about the employee's access to servers, production databases, non-prod databases and the softwares installed in the desktop.
SPIBDs: N/A                          Portfolio: IT-VDS1 - Subsistance x_Mitra
                                         APPLID: BF6V
Global Sourcing: Not Answered        GSIBs:
       CPNL: Not Answered            Internet Facing: Not Answered
       PCI: Not Answered             SOX: Not Answered
       SPIMPI: Not Answered

Score Details
Exists: Yes, 0
No GSD and Global Sourcing not answered: 0
CPNL Not answered: 3
PCI Not answered: 3
SOX Not answered: 3
SPIMPI Not answered: 3

FIGURE 7H

Application Detail: BF6V - VDSI_EP

| Score Summary | 70 | Global Score | 6 | CAD: 3F6V | 0 | S.A.TS: 9383 | 0 | dCATs: BF6 | 0 | X Check | 0 |
|---|---|---|---|---|---|---|---|---|---|---|---|
| Project: 694 | 49 | Project Contacts | 6 | Project Systems | 0 | Project Software | 0 | Review: 939 | 0 | RFSE: N/A | 0 |

| First Name | Last Name | Email Address | Project Role |
|---|---|---|---|
| Ken | Smith | ks@email.com | Data Trustee |

Score Details
Exist: Yes: 0
SPOC: Yes: 0
Manager: No: 2
Director: Yes: 0
Executive Director (ED): Yes: 0
Vice President (VP): No: 2
Senior Vice President (SVP): Yes: 0
Chief Information Officer (CIO): No: 2
Data Trustee: Yes: 0

FIGURE 71

Application Detail: BF6V - VDSI_EP

| Score Summary | 70 | Global Score | 0 | vSAD: BF6V | 0 | dCATs: BF6 | 0 | X-Check | 0 |
| Project: 094 | 60 | Project Contacts | 0 | Project Systems | 0 | Project Software | 0 | Review: 039 | 19 | RFSE: N/A | 0 |

| Status | Facility | Environment | End Point | Platform | Role | Model | Host Name | DNS Suffix | IP Address | System Type | Vendor |
|---|---|---|---|---|---|---|---|---|---|---|---|
| Live | VDSI Viceroy (India) | Development | Internal | Windows 2003 | WebAppsDB | ProLiant DL380 G2 | INOLYP1CBITCW03 | VDSI.ENT.VERIZON.COM | 114.9.185.44 | Standalone | |
| Live | VDSI Viceroy (India) | Production | Internal | Windows 2003 | WebAppsDB | DL5G2 | INOLYP1CBITCW01 | VDSI.ENT.VERIZON.COM | 114.9.185.10 | Standalone | |
| Live | VDSI Viceroy (India) | System Test | Internal | Windows 2003 | WebAppsDB | DL5G2 | INOLYP1CBITCW02 | VDSI.ENT.VERIZON.COM | 114.9.185.11 | Standalone | |

Score Details
Exist: Yes: 0
Network Zones: One: 0

FIGURE 7J

Application Detail: BF6V - VDSI_EP

| Score Summary | 79 | Global Score | 0 | vSAD: BF6V | 0 | VAST: 19363 | 0 | dCATs: 086 | 0 | X Check | |
|---|---|---|---|---|---|---|---|---|---|---|---|
| Project: 694 | 40 | Project Contacts | 0 | Project Systems | 0 | Project Software | 0 | Review: 0.30 | 0 | RFSE: N/A | |

| Software Name | Vendor | Platform | Version | Description | Software Type | Purchase Date | Std | Exc | Exception Number |
|---|---|---|---|---|---|---|---|---|---|
| IIS Web Server | Microsoft | Windows 2003 | 6.0 | Web Server | Commercial | 07/04/2006 12:03:08 AM | Yes | No | |
| Sql Server 2005 | Microsoft | Windows 2003 | 9.0 | Sql Server | Commercial | 05/08/2006 12:03:08 AM | Yes | No | |

Score Details
Exist: Yes 0
Open Source Software: None 0
Abandoned Software Exception: None 0

Application Detail: IP7V - IPCCC

FIGURE 8B

My Work Queue - Ken Smith

Ken Smith

| Application ID | | Project | Final Date | Stat |
|---|---|---|---|---|
| N/A / N/A / D7MV | 400903210 - QuickComm | | | |
| 861 / STATUSPRO / BTW | 23015020 - StatusPro New GUI Labs | | 09/09/2009 | In Progress |
| 3019 / DIALDBUK / DILV | 23018010 - Dial Database (UK) - CPL 303 Architecture Change | | 09/14/2009 | In Progress |
| 19046 / CSAFE / C3HV | 23018230 - CSAFE | | 09/14/2009 | In Progress |
| 18134 / ATLAS-CM / AT4V | 23007790 - Atlas - Customer Hierarchy | | 09/15/2009 | In Progress |
| 14007 / KUP / KU1V | 23007370 - Compensation Unification Program (CUP) | | 09/16/2009 | In Progress |
| 18645 / CPT / B8V | See 08/07 and 08/12 e-mails to Clark, David M (Davey - asking for App Scan and remediation for three unencrypted backend connections...meet w/ app team - they advised they did not have funding to to the registry issues...then thought they might. 08/11? | | 09/17/2009 | In Progress |
| 479 / ESP / ESQV | I sent list of latest steps and a request to complete backend doc. (Ron just had them add server and port info into the BRC) - they confirmed no new back end comm since Ron worked the review - see 08/20 e-mail to Raja Reddy asking for backend doc | | 09/18/2009 | In Progress |
| N/A / N/A / BADV | | | 09/18/2009 | In Progress |
| 2901 / MCS-C / CM1 / MC2V | and USL for app scan - 08/26 sent another follow to Raja for URL and better backend doc. -mpp | | 09/25/2009 | In Progress |
| 15854 / ICRD / IC1V | | | 09/25/2009 | On Hold |
| 16354 / ITASCAN / ASSV | 23014230 - ITAS: Application Security Scan - New Sensors | | 09/25/2009 | In Progress |
| 13657 / DBS / DB1 G | 23020090 | | 09/25/2009 | In Progress |

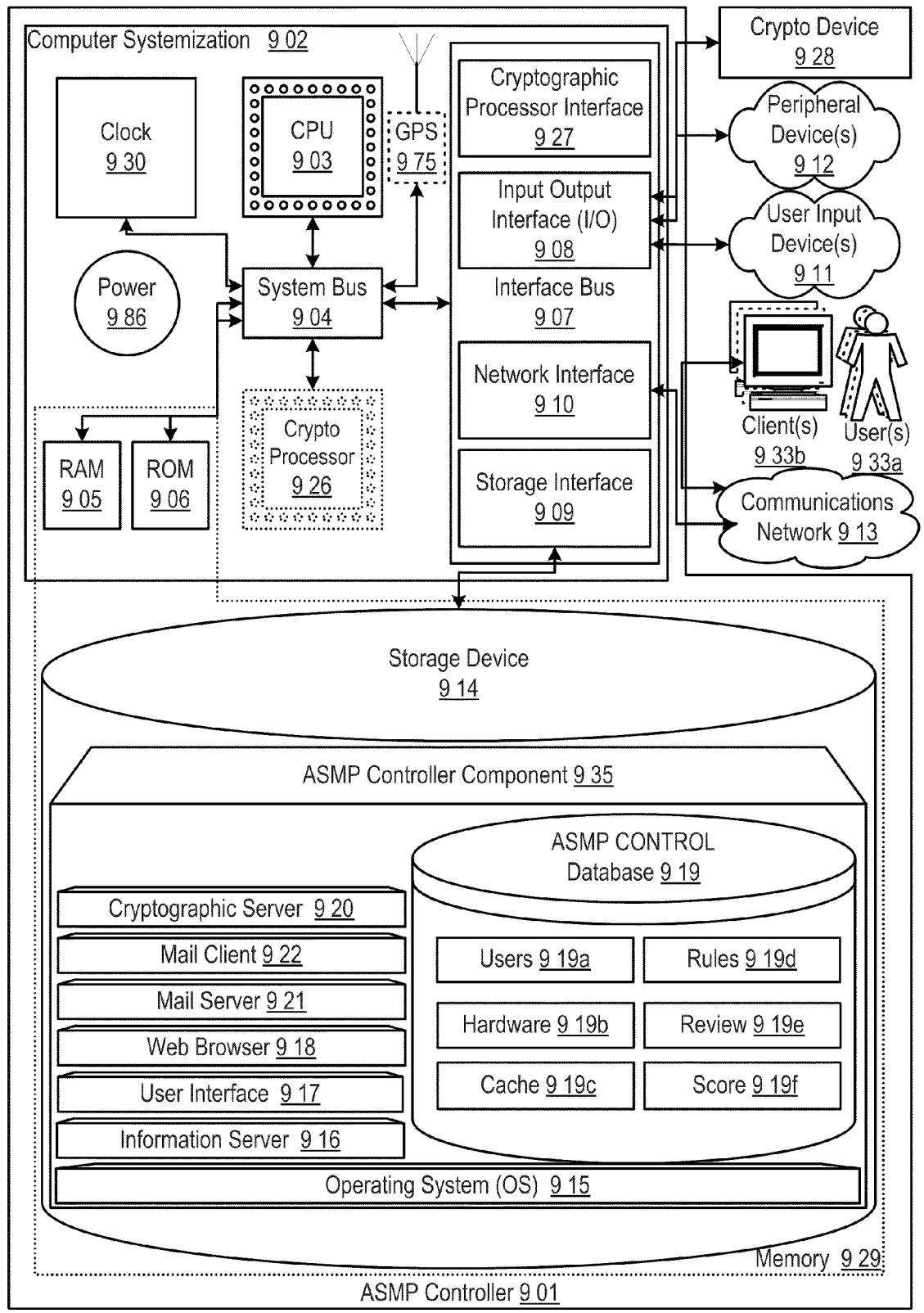

APPARATUSES, METHODS AND SYSTEMS OF AN APPLICATION SECURITY MANAGEMENT PLATFORM

BACKGROUND

Recent advances in information technology include the development of software including network applications that can be accessed and shared over the Internet. Such network software applications may cause potential security risks throughout the design, development, deployment, upgrade, and/or maintenance processes. For example, an E-commerce web platform may encounter security violations such as cookie manipulation, credential theft, cross-site scripting and/or the like.

BRIEF DESCRIPTION OF THE DRAWINGS

FIGS. 5A-C provide examples of user interface screenshots illustrating aspects of registering a system/application with data sources illustrating aspects of one embodiment of ASMP operation;

FIGS. 6A-M provide examples of user interface screenshots illustrating aspects of application scoring in one embodiment of ASMP operation;

Figure 7D:
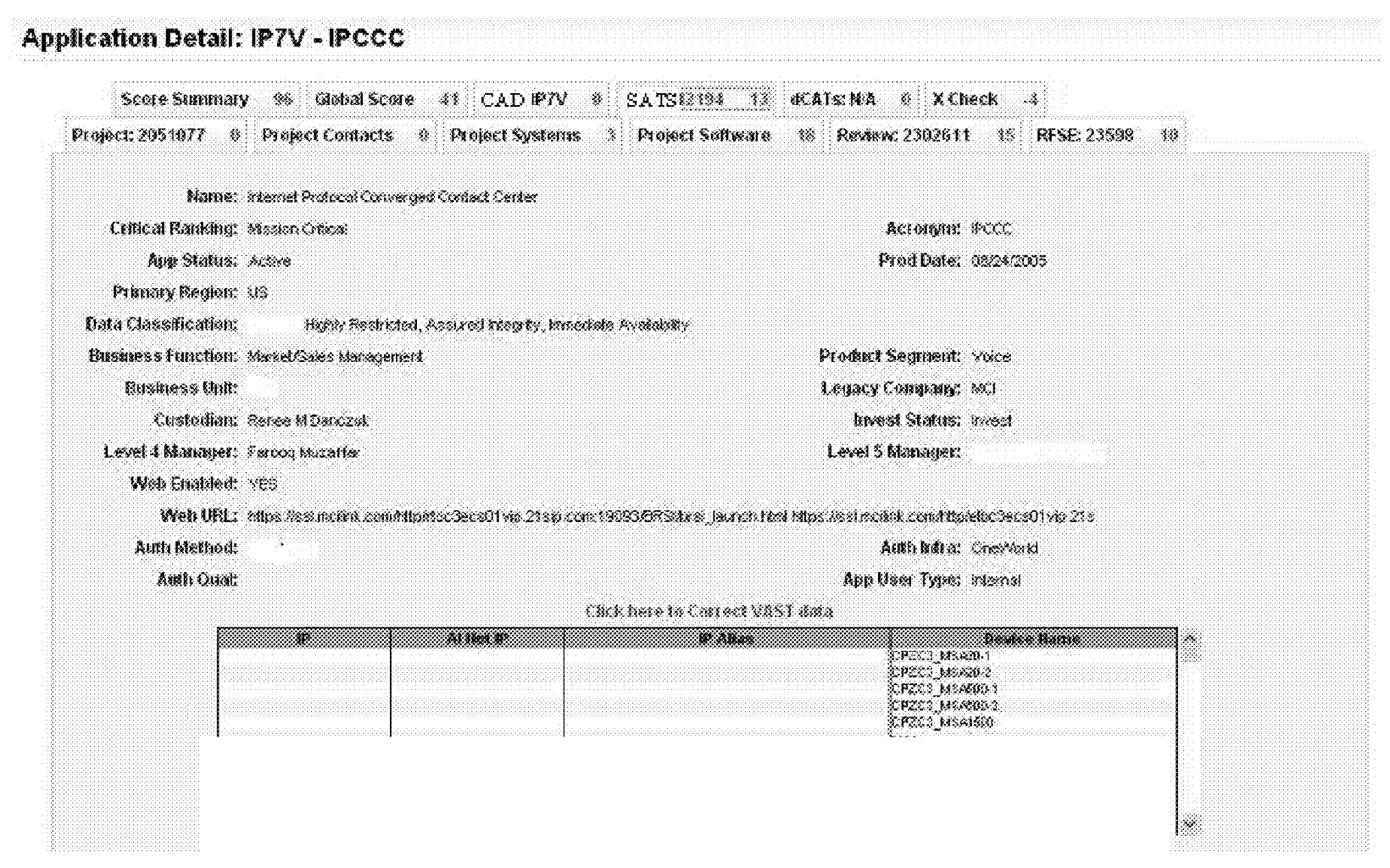

FIGS. 7A-L provide examples of user interface screenshots illustrating aspects of analyzing application details in one embodiment of ASMP operation;

FIGS. 8A-C provide examples of user interface screenshots illustrating aspects of security professional review process in one embodiment of ASMP operation;

FIG. 9 is of a block diagram illustrating aspects of exemplary embodiments of an ASMP controller.

Figure 1:
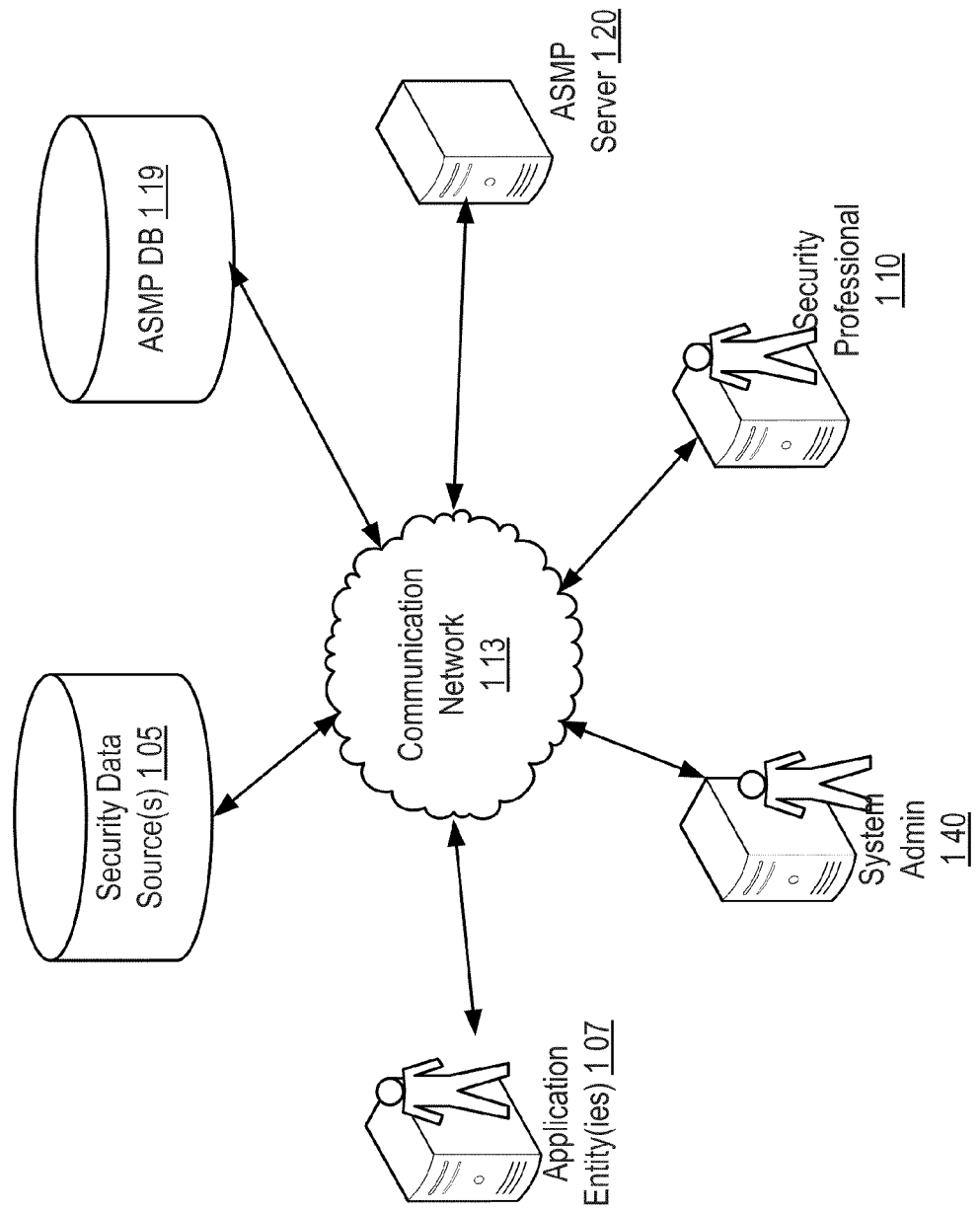
FIG. 1 provides an overview of an implementation of data flow between an application security management platform (hereinafter "ASMP") system and affiliated entities illustrating aspects of one embodiment of ASMP operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure details the implementation of apparatuses, methods and systems of an application security management platform (hereinafter, "ASMP"). ASMP systems may, in one embodiment, implement a live dashboard platform on a computerized system, whereby the platform may receive security data associated with a running application from multiple security tracking systems, evaluate the security performance of the application, generate an application security summary report for review and manage review processes.

For example, in one embodiment, the ASMP application may be installed on a network server of a local area network (LAN) of an entity and operated by one or more users. For instance, in one implementation, the users may be security professionals of the entity. In one embodiment, the ASMP may download security data from a plurality of security data sources, wherein the security data is associated with different applications implemented at hosts and terminals within the LAN of the entity. For instance, in one implementation, the security data sources may include a corporate application directory (CAD), a security and asset tracking system (SATS), a data classification and trustee system (DCATS), a security resource (SRC) system, and/or the like. In one implementation, a SATS may be implemented by software such as, but not limited to, the Computrace® by Absolute® Software, the Numara® Track-it package, or the like. Such systems may be implemented to monitor and scan network ports, gateways, routing information of terminal computers, workstations and/or the like on the network to track various aspects of each application running within the network. In one embodiment, a DCATS may include a repository of data classification such as data confidentiality, integrity and availability (CIA), and the data's trustees by application, etc. In one embodiment, a SRC system may include a repository of security information from past and ongoing application security audits, such as, but not limited to data CIA, application software information, server information, contacts, port scan information, application scan information, and/or the like.

In one embodiment, the ASMP may employ a scanning management tool to collect security data from scan results of applications, computers, and network ports that have been scanned by the SATS. For example, in one implementation, an Assessment Management Platform (AMP) may be utilized to obtain scanning information via a web service call, such as, but not limited to SpiDynamics® WebInspect®, and/or the like. In one embodiment, the ASMP may store a local cached copy of application data and the associated security data, and may synchronize the local cached data with the data sources, such as CAD, SATS, SRC, etc. In one implementation, the security data from such data sources may be loaded into the ASMP in XML in real time. For example, the XML output that is received for vulnerability results from a SRC system may be in a form similar to the following:

```
POST /AMPSecure8/managerservice.asmx HTTP/1.1
Host: ndcsrv173.vzbi.com
Content-Type: text/xml; charset=utf-8
Content-Length: length
SOAPAction: "urn:com:spidynamics:webservices:Amp/GetAllCompletedScans"
<?xml version="1.0" encoding="utf-8"?>
<soap:Envelope xmlns:xsi="http://www.w3.org/2001/XMLSchema-instance"
  xmlns:xsd="http://www.w3.org/2001/XMLSchema"
  xmlns:soap="http://schemas.xmlsoap.org/soap/envelope/">
  <soap:Body>
    <GetAllCompletedScans xmlns="urn:com:spidynamics:webservices:Amp">
      <licenseToken>string</licenseToken>
```

```
            </GetAllCompletedScans>
        </soap:Body>
</soap:Envelope>
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
        <soap:Body>
            <GetAllCompletedScansResponse
xmlns="urn:com:spidynamics:webservices:Amp">
                <GetAllCompletedScansResult>
                    <Scan>
                        <ElapsedTicks>long</ElapsedTicks>
                        <Settings>string</Settings>
                        <DefaultEncoding>string</DefaultEncoding>
                        <ScheduledTaskID>guid</ScheduledTaskID>
                        <ScanTemplateID>guid</ScanTemplateID>
                        <Custom>boolean</Custom>
                        <CustomWISettings>boolean</CustomWISettings>
                        <CustomReportSettings>boolean</CustomReportSettings>
                        <CustomExportSettings>boolean</CustomExportSettings>
                        <AutoGenerateReport>boolean</AutoGenerateReport>
                        <ReportGenerator>
                            <ReportTarget xsi:nil="true" />
                            <ReportTemplate xsi:nil="true" />
                            <ReportScans xsi:nil="true" />
                            <EmailAddresses xsi:nil="true" />
                            <ReportName>string</ReportName>
                        </ReportGenerator>
                        <AutoGenerateExport>boolean</AutoGenerateExport>
                        <ExportSettings>
                            <ExportPath xsi:nil="true" />
                            <ExportFilename>string</ExportFilename>
                            <ExportFormat>WebInspect or XML</ExportFormat>
                            <AutoGenerateFilename>boolean</AutoGenerateFilename>
                        </ExportSettings>
                        <BlackoutMode>Suspend or Abort</BlackoutMode>
                    </Scan>
                    <Scan>
                        <ElapsedTicks>long</ElapsedTicks>
                        <Settings>string</Settings>
                        <DefaultEncoding>string</DefaultEncoding>
                        <ScheduledTaskID>guid</ScheduledTaskID>
                        <ScanTemplateID>guid</ScanTemplateID>
                        <Custom>boolean</Custom>
                        <CustomWISettings>boolean</CustomWISettings>
                        <CustomReportSettings>boolean</CustomReportSettings>
                        <CustomExportSettings>boolean</CustomExportSettings>
                        <AutoGenerateReport>boolean</AutoGenerateReport>
                        <ReportGenerator>
                            <ReportTarget xsi:nil="true" />
                            <ReportTemplate xsi:nil="true" />
                            <ReportScans xsi:nil="true" />
                            <EmailAddresses xsi:nil="true" />
                            <ReportName>string</ReportName>
                        </ReportGenerator>
                        <AutoGenerateExport>boolean</AutoGenerateExport>
                        <ExportSettings>
                            <ExportPath xsi:nil="true" />
                            <ExportFilename>string</ExportFilename>
                            <ExportFormat>WebInspect or XML</ExportFormat>
                            <AutoGenerateFilename>boolean</AutoGenerateFilename>
                        </ExportSettings>
                        <BlackoutMode>Suspend or Abort</BlackoutMode>
                    </Scan>
                </GetAllCompletedScansResult>
            </GetAllCompletedScansResponse>
        </soap:Body>
</soap:Envelope>
```

In one embodiment, the ASMP may store the obtained data in the local cache and evaluate an application based on the obtained security data associated with the specific application. For example, in one implementation, the ASMP may retrieve application information from the CAD, and for each application, the ASMP may determine a risk factor intake form containing security criterion questions. In one implementation, the ASMP may generate and display risk factor intake questions to a security professional, and the security professional may submit responses, including potentially a numeric score for using in calculating the risk factor associated with the application based on the obtained security data.

In one embodiment, the ASMP may allow a security professional to search local cached data from all data sources. For example, in one implementation, the ASMP may form a query based on an application ID and/or application acronym specified by a user to search for relevant security data with the specified application among the local cached data from multiple sources. As another example, a query may be formed based on a specified IP address, and the security data associated with the host under the specified IP address may be returned.

In one embodiment, the ASMP may perform a cross check for data received from multiple security data sources prior to scoring an application, and if a particular data item is fed by different data sources, a predefined agreement rule may be applied to determine the content of the particular data item based on the received data. For example, in one implementation, the data item "Data CIA" may be included in data from both the SATS the DCATS. In some cases, the "Data CIA" fed by the SATS may read "CIA low" but the "Data CIA" fed by DCATS may read "CIA high." In such cases, a cross-check agreement rule may be applied to record the most critical scenario for "Data CIA" values. For example, in this case, the "Data CIA" value may be noted as "CIA high" for the associated application.

In one embodiment, ASMP systems may manage the review processes. For example, in one implementation, the ASMP may maintain an exclusive work queue for a user. When the user logs in the ASMP system, a "my work queue page" may be displayed, presenting a custom list of separate work queues such as pending reviews of security reports, pending reviews of applications, pending reviews of other data depending on the assignment to the user, and/or the like.

In one embodiment, a method is disclosed, comprising: obtaining application security data from a plurality of data sources; associating the obtained data with at least one application; generating a risk factor matrix for the at least one application based on the obtained data; and evaluating the at least one application based on the generated risk factor matrix.

It is to be understood that, depending on the particular needs and/or characteristics of an ASMP application, associated security data sources, associated operating system, user interface, object, administrator, server, hardware configuration, network framework, and/or the like, various embodiments of the ASMP may be implemented that enable a great deal of flexibility and customization. The instant disclosure discusses embodiments of the ASMP primarily within the context of analyzing application security performance. However, it is to be understood that the system described herein may be readily configured/customized for a wide range of other applications or implementations. For example, aspects of the ASMP may be adapted for mobile device security management, asset tracking systems, and/or the like.

FIG. 1 provides an overview of an implementation of data flow between an ASMP system and affiliated entities in one embodiment of ASMP operation. In FIG. 1, one or more security data sources 105, one or more application entities 107, one or more users (e.g. in one implementation, security professionals) 110, an ASMP server 120, an ASMP database 119 and a system administrator 140 are shown to interact via a communication network 113. The application entities (e.g. one or more application user) 107 and the users 110 may include a wide variety of different communications devices and technologies within embodiments of ASMP operation. For example, in one embodiment, the application entity 107 and the user 110 may include, but are not limited to, terminal computers, work stations, servers, cellular telephony handsets, blackberries, PDAs, and/or the like. In one embodiment, the ASMP server 120 may be equipped at a terminal computer of the user 110. In another embodiment, the ASMP server 120 may be a remote server which is accessed by the user 110 via a communication network 113, such as, but not limited to a local area network (LAN), in-house intranet, the Internet, and/or the like.

In one embodiment, an application entity 107 may submit security data related to the application to the communication network 113 during the security scanning of web services, such as SpiDynamics®, WebInspect® and/or the like. A security data source 105 may collect and store the security data related to applications via the communication network 113. In one embodiment, the security data source 105 may include, but need not be limited to the CAD, SATS, DCATS, SRC systems as discussed above, and/or the like. In one implementation, the CAD may provide data such as application name, application ID, associated SATS ID, Mission Criticality (MC), owning entity, and/or the like; the SATS may provide data such as the SAT ID, the SAT acronym, application name, data classification (e.g. CIA, etc.), MC, software licensing information, contacts, servers, interfaces to other applications, compliance report, offshore (or other) access reports, and/or the like; the DCATS may provide data such as data CIA information, data trustee information (e.g. by CAD ID), acting trustee information and/or the like; the SRC system may provide data such as data CIA, application software information, servers, contacts, port scan information, application scan information, and/or the like.

In one embodiment, the ASMP server 120 may request connection to the security data source 105 to download data on-demand or via other methods. For example, in one implementation, the ASMP server 120 may receive a request from a user 110 to refresh the cached security data and/or generate application reviews. In another embodiment, the ASMP may be configured to update and/or synchronize the latest security data with the security data source 105 periodically. The ASMP server may obtain security data from the security data source 105 in a variety of ways. For example, in one implementation, the ASMP server 120 may download security data in spreadsheets, pdf files, CSV files, and/or other document formats through ftp transfer, packaging in directory, XML feeds, and/or direct database connection with an online database, and/or the like. In another implementation, the security data source 105 may provide http posts, xml feeds of security data and other data downloading formats.

In one embodiment, the ASMP server 120 may generate security risk intake forms for each application for application scoring. In one implementation, the ASMP server 120 may generate answers to intake questions based on the obtained security data. In another implementation, the ASMP server 120 may display the intake form to a security professional and receive answers and scores to each security question from the user (security professional). In another embodiment, the ASMP server 120 may generate application reviews based on the security data and send them to a user 110. For example, in one embodiment, the ASMP server 120 may display an application security review on a screen to the user 110, send an email including the review report, and/or the like. In one embodiment, the user 110 may submit review comments to the ASMP server 120, such as, but not limited to, review schedule, review progress, and/or the like.

Figure 5A:
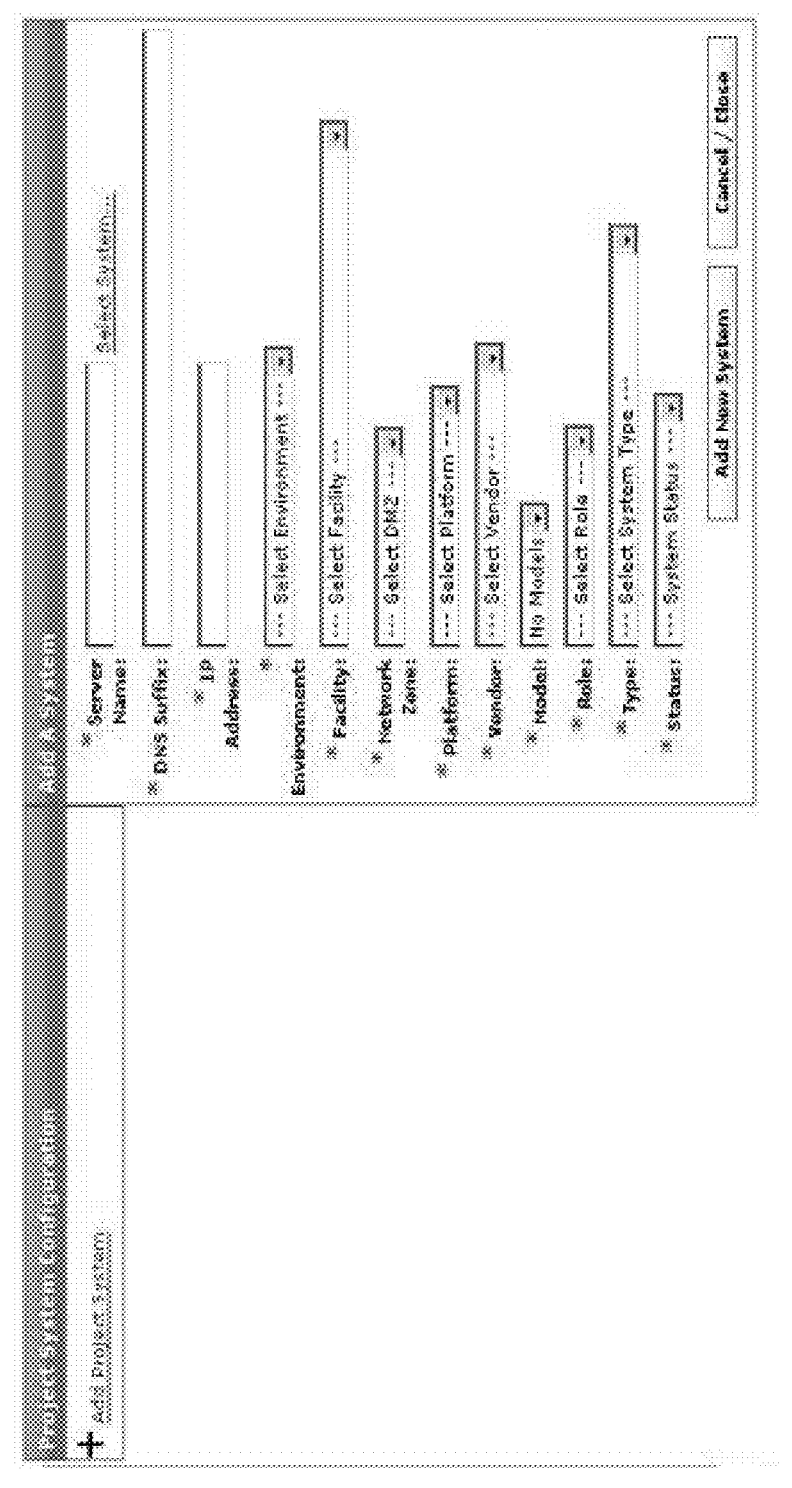
Figure 5B:
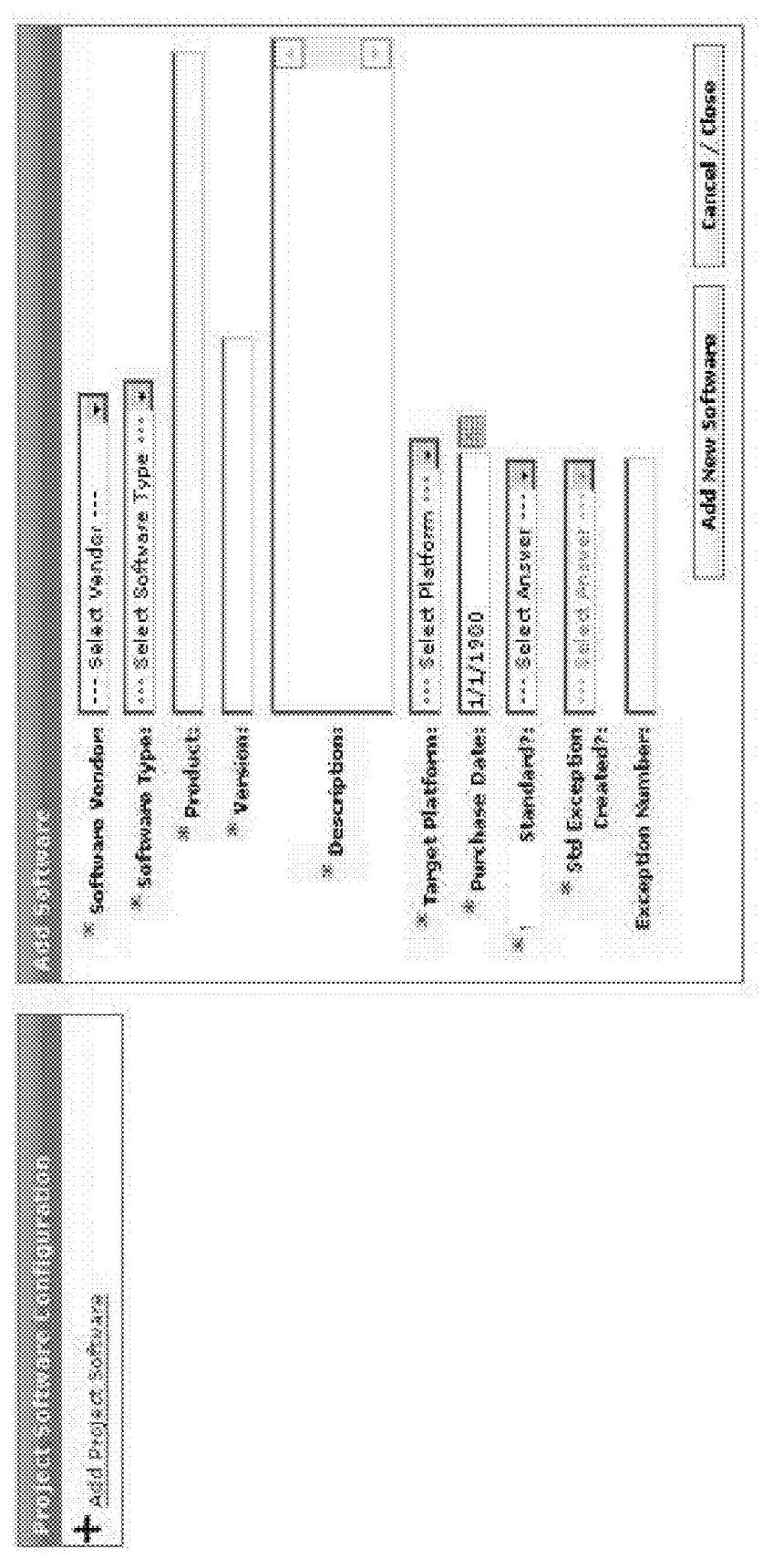

In one embodiment, a user 110 may configure the settings of the external security data sources for the ASMP system. For example, in one implementation, a user 110 may determine a monitoring range of a data source 105 for the ASMP, e.g., an entire entity network, a subsystem of a business unit within the entity network, and/or the like. As another example, a user 110 may add a new application to the monitoring range of the data sources for the ASMP, as will be shown in FIGS. 5A-C. In FIG. 5A, in one implementation, a system may be registered to a security data source to be monitored and a user may submit via the shown user interface information of the system such as, but not limited to server name, DNS suffix, IP address, facility, network zone, platform, vendor and/or the like. In FIG. 5B, in one implementation, software associated with the monitored system may be registered to a security data source and registration information may be submitted via the shown user interface, such as, but not limited to software vendor, software type, software description, software version, target platform, purchase date, and/or the like. In FIG. 5C, in one implementation, a new application may be added to the monitored network and registration information may be submitted via the shown user interface, such as, but not limited to requestor information, application purpose description, application phase, application information, and/or the like.

In one embodiment, the user 110 may configure the system settings for synchronization schedules with security data sources. For example, in one implementation, the user 110 may configure the ASMP server 120 and ASMP database 119 to update security data at midnight on a daily basis. In a further implementation, the user 110 may define agreement rules of storing and invoking data elements from multiple data sources. For example, in one implementation, the user 110 may configure a data source as priority source for a data item which may be fed from different data sources.

In one embodiment, the ASMP server 120 may also communicate with an ASMP database 119, for example, in one implementation, to store the obtained security data as a local cache copy. In some embodiments, an ASMP server 120 may be integrated with a local ASMP database 119. In other embodiments, an ASMP server 120 may access a remote ASMP database 119 via the communication network 113. The ASMP server 120 may send the information to the database 119 for storage, such as, but not limited to user account information, cached application security data from security data sources 107, agreement rules of multiple data sources, review memoranda, and/or the like.

In one embodiment, a system administrator 140 may communicate with the ASMP server 120 and the ASMP database 119 for regular maintenance, service failure, system updates, database renewal, and/or the like. In one embodiment, the system administrator 140 may directly operate with the ASMP server 120 and the ASMP database 119 on an in-house basis, such as, but not limited to via an integrated administrator user interface. In another embodiment, the system administrator 140 may remotely access the ASMP server 120 and the ASMP database 119 and perform its functionality via the communication network 113.

Figure 2:
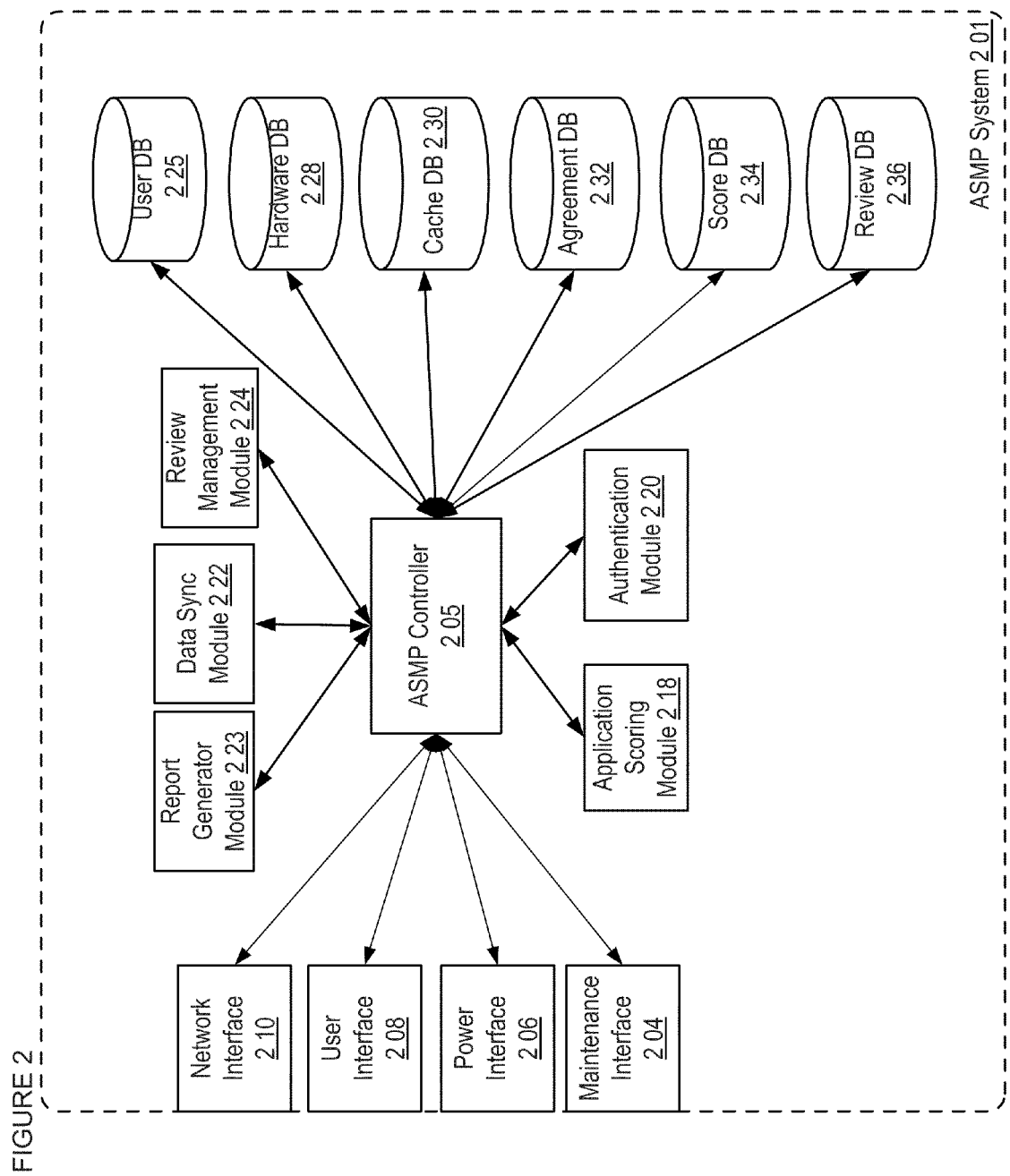
FIG. 2 shows an implementation of ASMP system components illustrating aspects of one embodiment of ASMP operation.

FIG. 2 shows an implementation of ASMP system components in one embodiment of ASMP operation. The ASMP system 201 may contain a number of functional modules and/or data stores. An ASMP controller 205 may serve a central role in some embodiments of ASMP operation, serving to orchestrate the reception, generation, modification, and distribution of data and/or instructions, to, from, and between ASMP modules and/or mediate communications with external entities and systems.

In one embodiment, the ASMP controller 205 may be housed separately from other modules and/or databases within the ASMP system, while in another embodiment, some or all of the other modules and/or databases may be housed within and/or configured as part of the ASMP controller. Further detail regarding implementations of ASMP controller operations, modules, and databases is provided below.

In the implementation illustrated in FIG. 2, the ASMP controller 205 may be configured to couple to external entities via a maintenance interface 204, a power interface 206, a user interface 208 and a network interface 210. The user interface 208 may, for example, receive and configure secured user account information, user submitted configuration data, user submitted security question answers, security review information from users (security professionals) and/or the like. In one implementation, the user interface 208 may include, but not limited to devices such as, keyboard(s), mouse, stylus(es), touch screen(s), digital display(s), and/or the like. In various implementations, the network interface 210 may, for example, serve to configure data into application, transport, network, media access control, and/or physical layer formats in accordance with a network transmission protocol, such as, but not limited to FTP, TCP/IP, SMTP, Short Message Peer-to-Peer (SMPP) and/or the like. For example, the network interface 210 may be configured for receive and configure security data downloaded from an external security data source. The network interface 210 may further be configurable to implement and/or translate Wireless Application Protocol (WAP), VoIP and/or the like data formats and/or protocols. The network interface 210 may further house one or more ports, jacks, antennas, and/or the like to facilitate wired and/or wireless communications with and/or within the ASMP system. In one embodiment, the maintenance interface 204 may, for example, configure regular inspection and repairs, receive system upgrade data, report system behaviors, and/or the like. In one embodiment, the power interface 206 may, for example, connect the ASMP system to an external power source.

In one implementation, the ASMP controller 205 may further be coupled to a plurality of modules configured to implement ASMP functionality and/or services. The plurality of modules may, in one embodiment, be configurable to implement a dashboard application presenting a live evaluation of the security and risk of applications running on different terminals within a local network to security professionals. In one embodiment, the ASMP may comprise modules such as, but not limited to a Reader module 214, an Application Scoring module 218, an Authentication module 220, a Data Synchronization module 222, a Report Generator Module 223, a Review Management Module 224 and/or the like.

In one embodiment, the Application Scoring module 218 may score each application based on the security data. In one embodiment, the Application Scoring module 218 may generate, retrieve or receive an intake security criterion question form for each application, based on the answers of which the Application scoring module 218 may generate a risk factor matrix with risk scores for each application, as will be further illustrated in FIG. 4A-4D.

In one embodiment, the Authentication module 220 may be configured to receive secured account information from a user (e.g. a security professional) via a user interface of the ASMP, and grant the user or group access to the ASMP if provided secured login information is correct. In one embodiment, users may configure group access to a plurality of reminders. For example, in one implementation, a plurality of security professionals reviewing monthly reports for all applications running on the local network may register as a group with the ASMP. Each member of the group may be granted access to read, write, modify and/or delete all review reports and tasks established by the group once the member has logged in as a member of the group. In one embodiment, the Authentication module 220 may communicate with the users database 225 to retrieve user profile information. In one embodiment, the Authentication module 220 may also communicate with the review database 234 to retrieve review data associated with a specific user. For example, in one implementation, the ASMP may automatically retrieve pending review tasks in work queues associated with a security professional and present an application review page once the security professional has logged in.

The Data Synchronization module 222 may synchronize local cached security data with external security data sources. In one embodiment, the Data Synchronization module 222 may be configured to connect to external security data sources and download security data constantly, periodically and intermittently. For example, in one implementation, the Data Synchronization module 222 may be configured to download security data according to a schedule in the system settings. In another implementation, the Data Synchronization module 222 may be configured to download security data based on user request, e.g. a security professional may send requests to refresh local cached data and/or to generate updated application reviews, and/or the like. In one embodiment, the Data Synchronization module 222 may communicate with the Security database 230, and store a local cached copy of security data in the Security database 230.

The Report Generator module 223 may generate a variety of application security summary reports, which may be used for tracking/evaluating project(s) progress. In one embodiment, the Report Generator module 223 may generate security review reports based on the application scores. For example, in one implementation, the Report Generator module 224 may generate a security report of a specified application, a security report based on security data from a specified data source, a report of review status associated with a specified security professional and/or a group of security professionals, and/or the like. In one embodiment, the reports may be generated/viewed via an ASMP user interface, and may be saved in a specified format (e.g. pdf, html, txt, and/or the like) and/or emailed to specific security professionals/groups. In another embodiment, a security professional may configure the ASMP to generate and/or mail the specific types of reports to the configured security professionals/groups on a periodical basis, and/or based on certain triggers/events. In one embodiment, the Report Generator module 223 may communicate with the Review database 234 and store the generated application review reports the Review database 234. The Review Management module 224 may store work queues for each user (security professional). In one embodiment, the Review Management module 224 may present review task to a user listed by time and date. In one embodiment, the Review Manager module 224 may send reminders to a user on a review task.

In one implementation, the ASMP controller 205 may further be coupled to one or more databases configured to store and/or maintain ASMP data. A User database 225 may contain information pertaining to account information, contact information, profile information, identities of hardware devices, Customer Premise Equipments (CPEs), and/or the like associated with users, reminder preferences, reminder configurations, system settings, and/or the like. A Hardware database 228 may contain information pertaining to hardware devices with which the ASMP system may communicate, such as but not limited to Email servers, user telephony devices, CPEs, gateways, routers, user terminals, and/or the like. The Hardware database 228 may specify transmission protocols, data formats, and/or the like suitable for communicating with hardware devices employed by any of a variety of ASMP affiliated entities. A Cache database 230 may store a local cached copy of security data downloaded from external security data sources. An Agreement database 232 may store agreement rules to process overlapped data sets from multiple data sources. A Score database 234 may store the security criterion answers, security evaluation scores of each application. A Review database 236 may store various security review reports of applications generated by the ASMP. The ASMP database may be implemented using various standard data-structures, such as an array, hash, (linked) list, struct, structured text file (e.g., XML), table, and/or the like.

Figure 3:
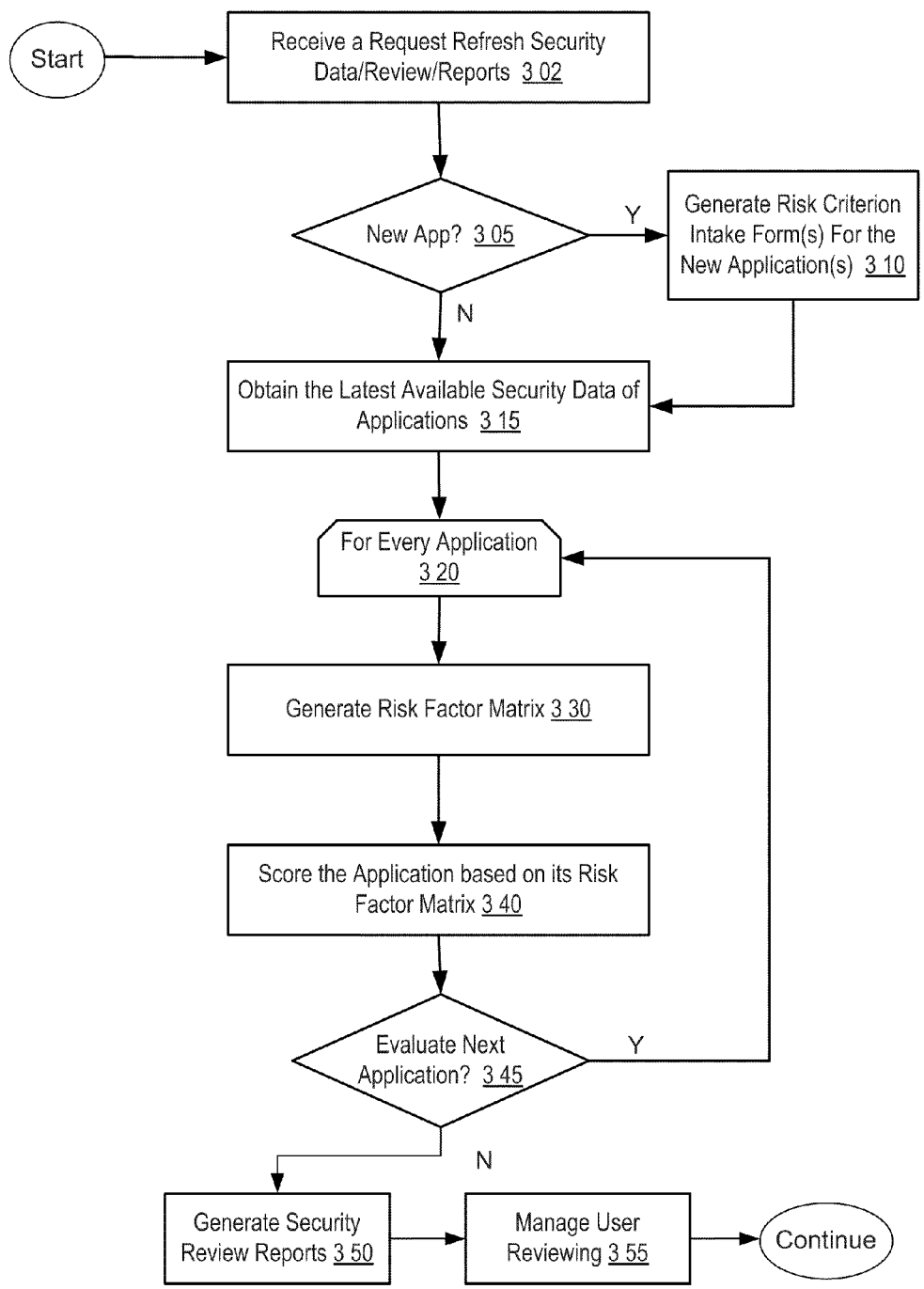
FIG. 3 shows an overview of ASMP logic flows for implementing an ASMP application illustrating aspects of one embodiment of ASMP operation.

FIG. 3 shows an overview of ASMP logic flows for implementing an ASMP application within one embodiment illustrating aspects of ASMP operation. In one embodiment, the ASMP may be initiated when receiving a request for application security review 302. In another embodiment, an ASMP operation of downloading security data and generating security reviews may be automatically initiated according to system configuration, e.g. on a periodical basis. In another embodiment, the ASMP application may be launched when a new application is added to the network.

Figure 4A:
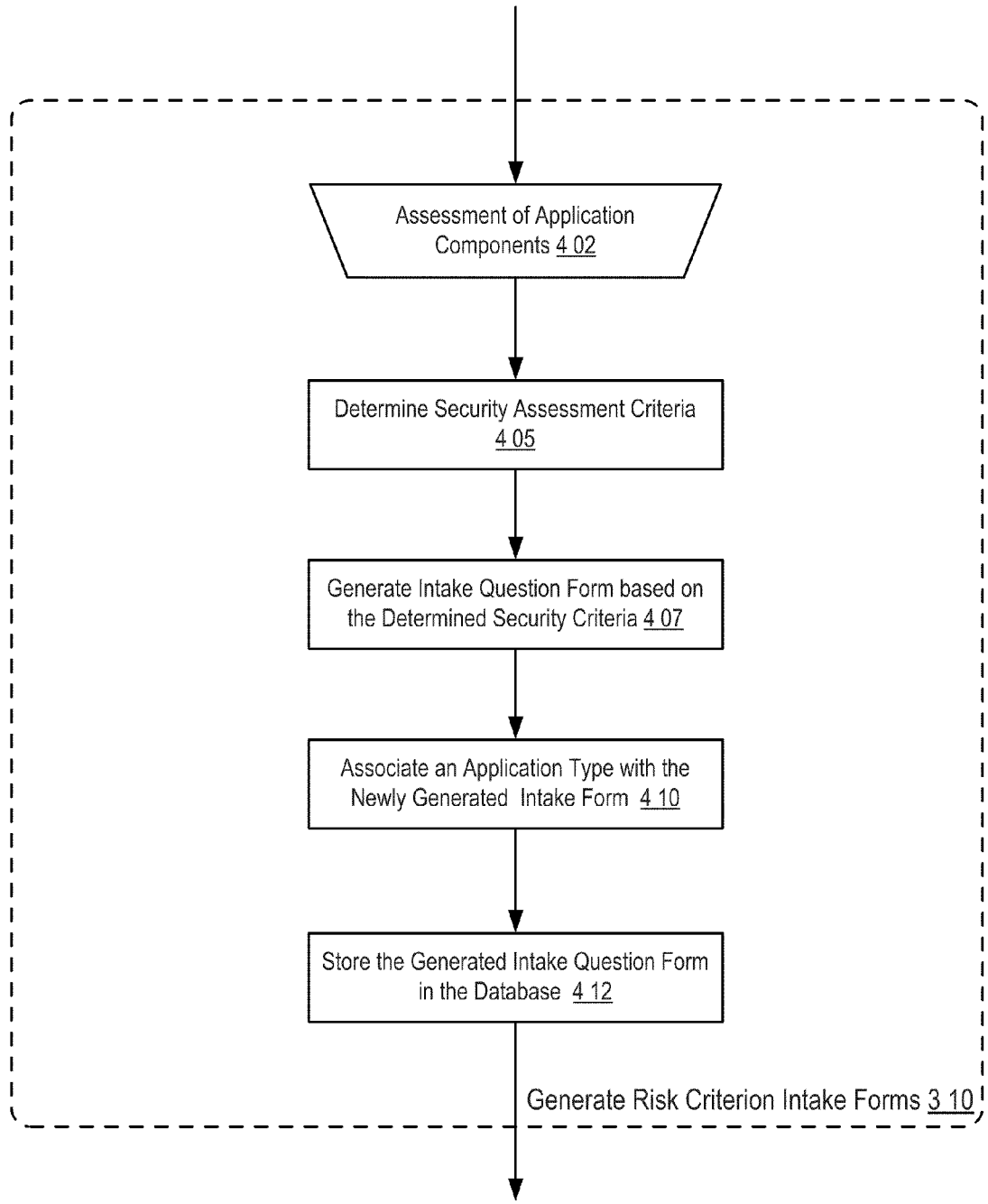
FIGS. 4A-D show aspects of logic flows for obtaining security data and application scoring in one embodiment within embodiments of ASMP operation.
Figure 6A:
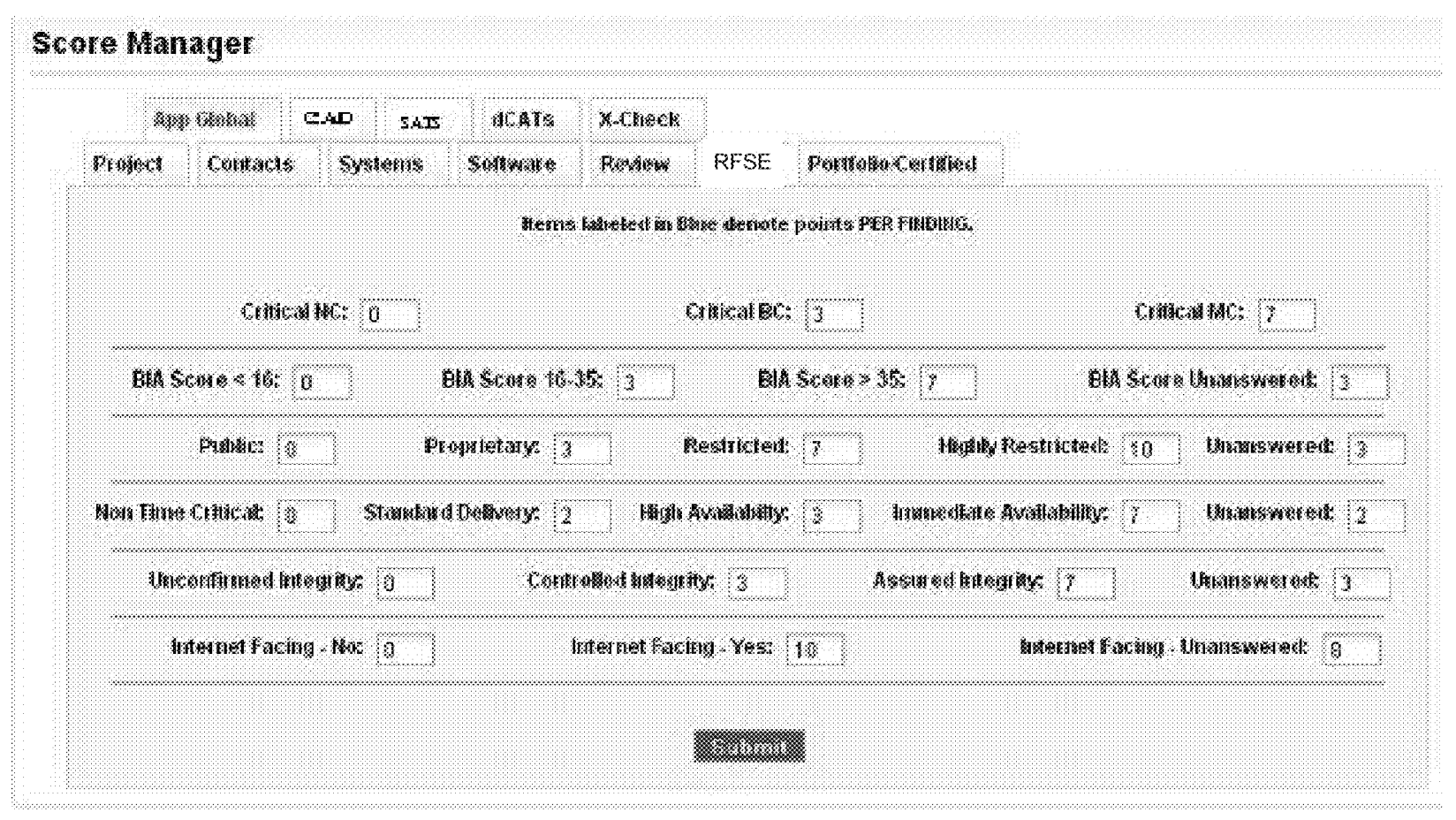
Figure 6C:
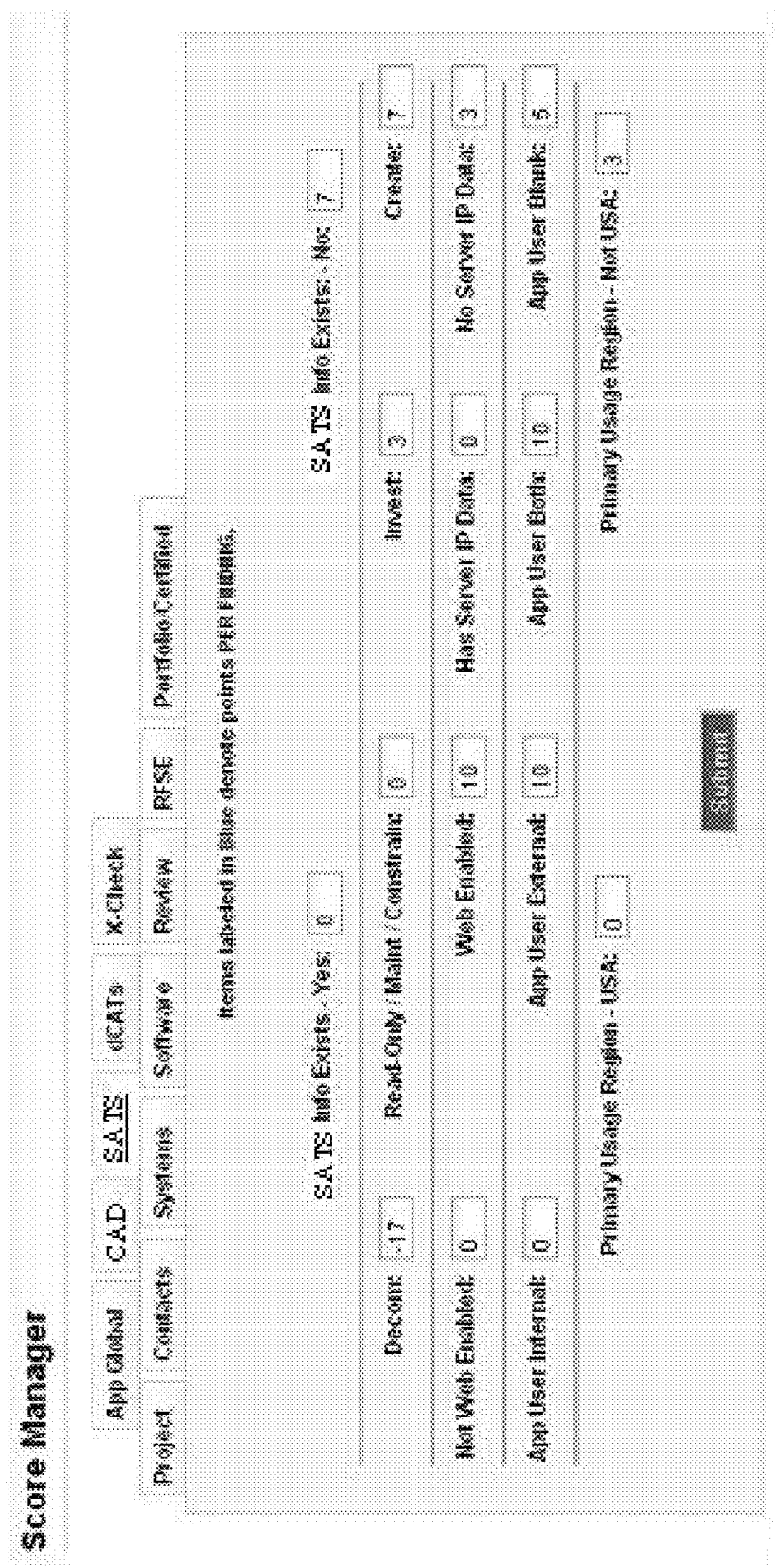
Figure 6D:
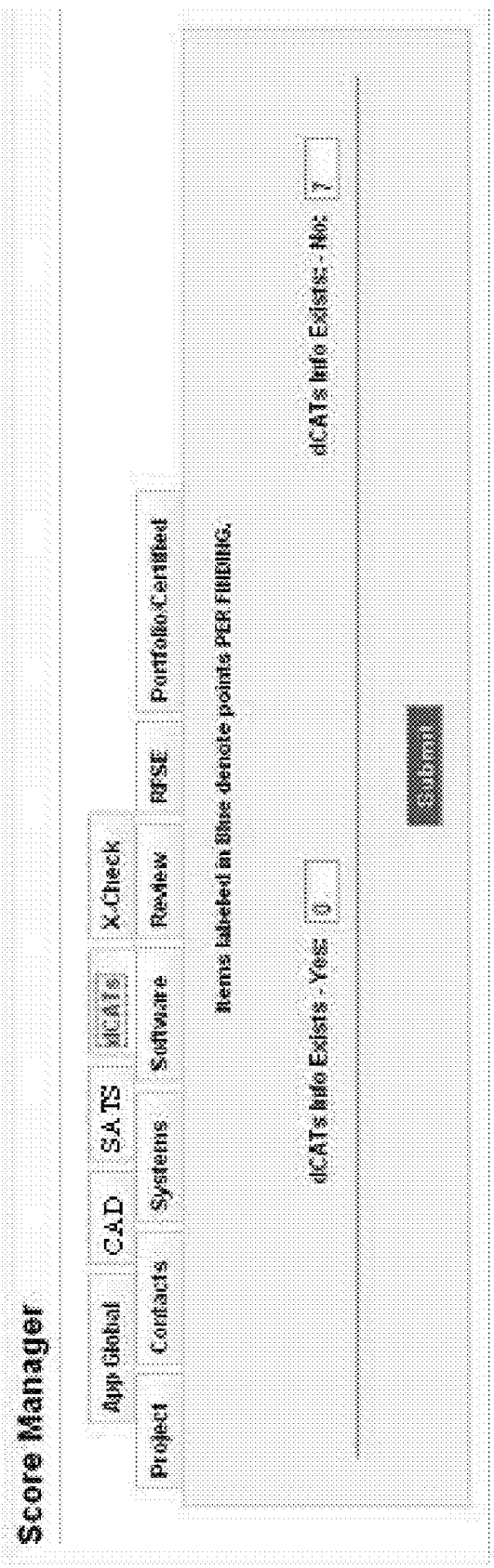
Figure 6E:
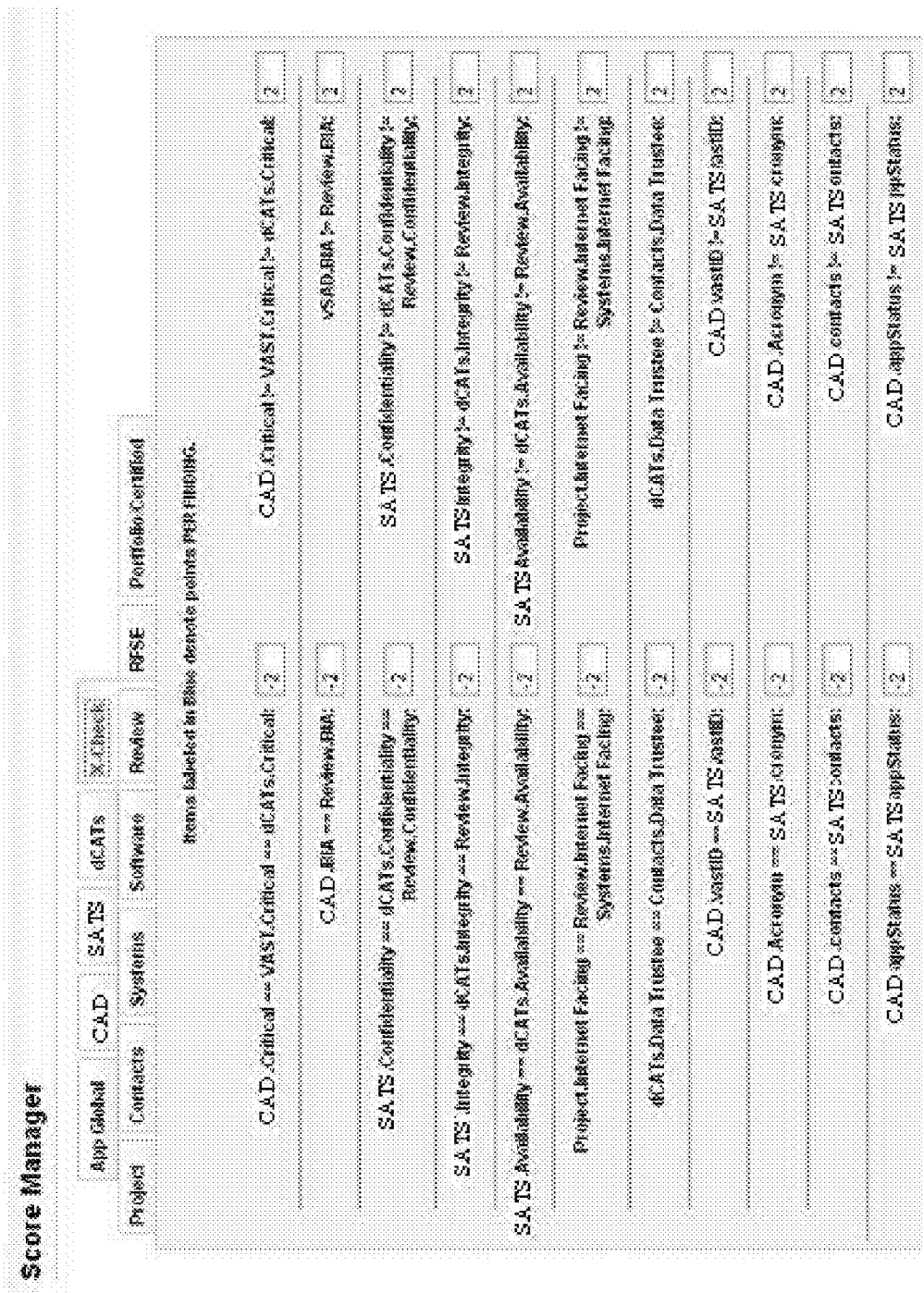
Figure 6F:
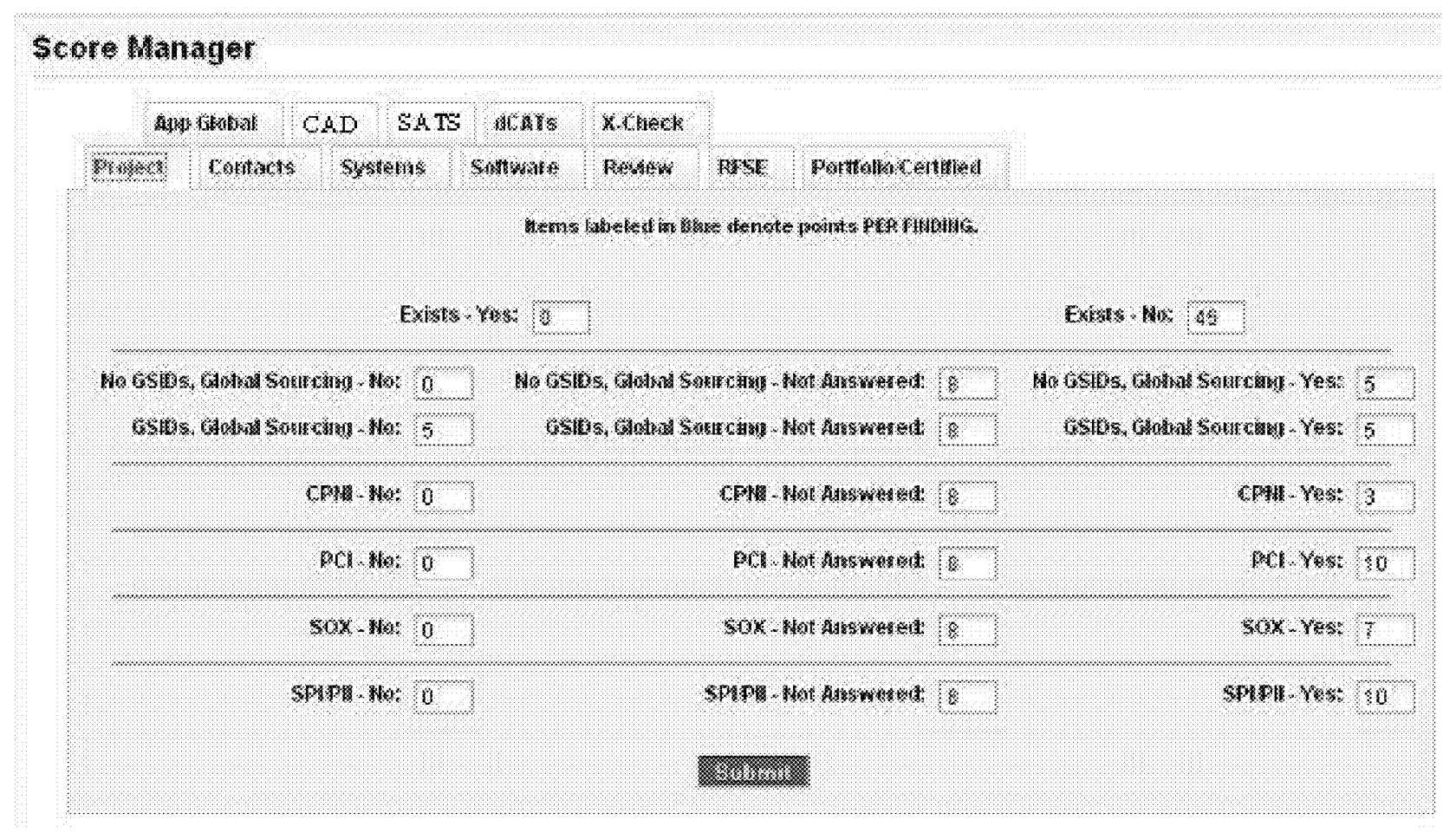
Figure 6G:
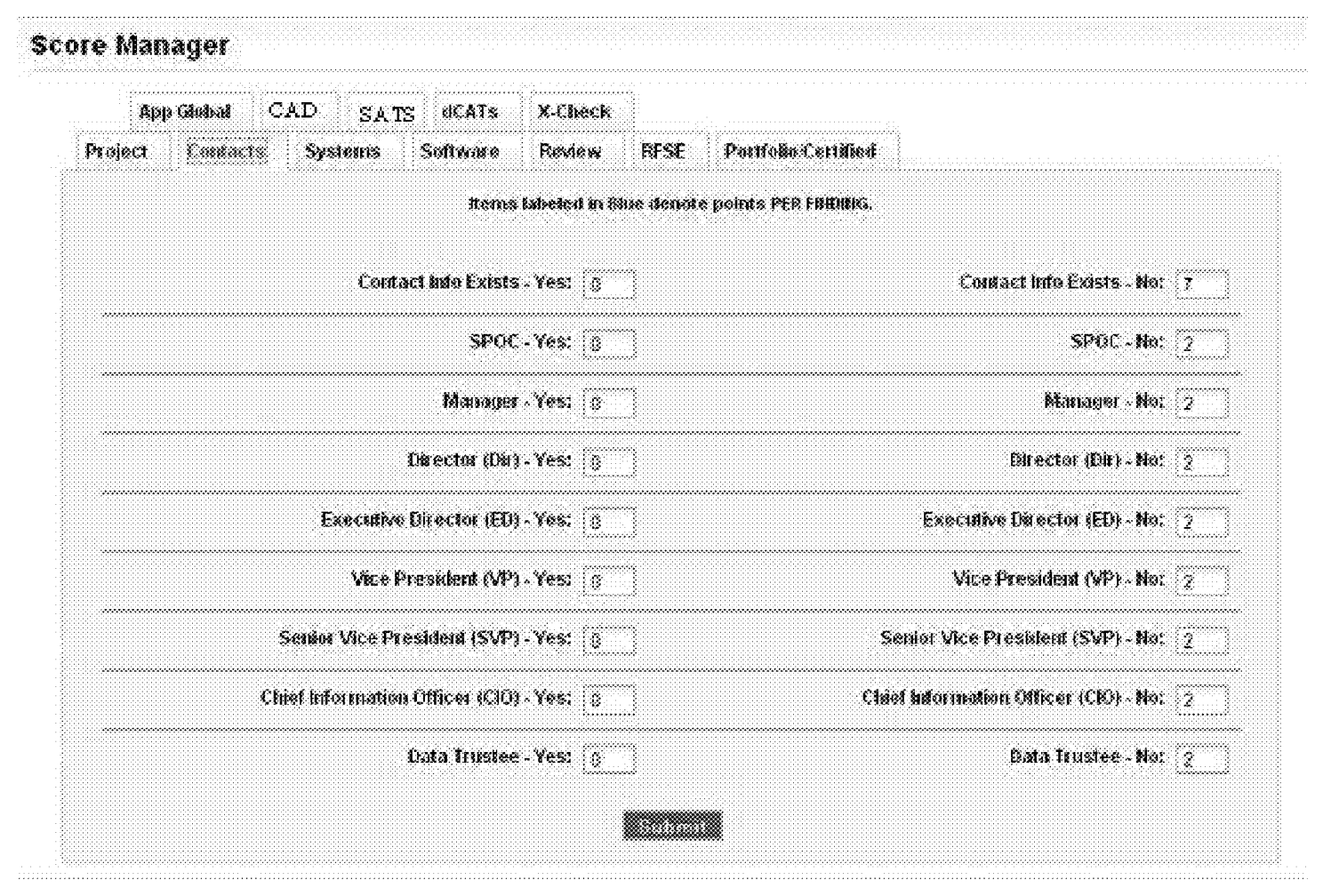
Figure 6H:
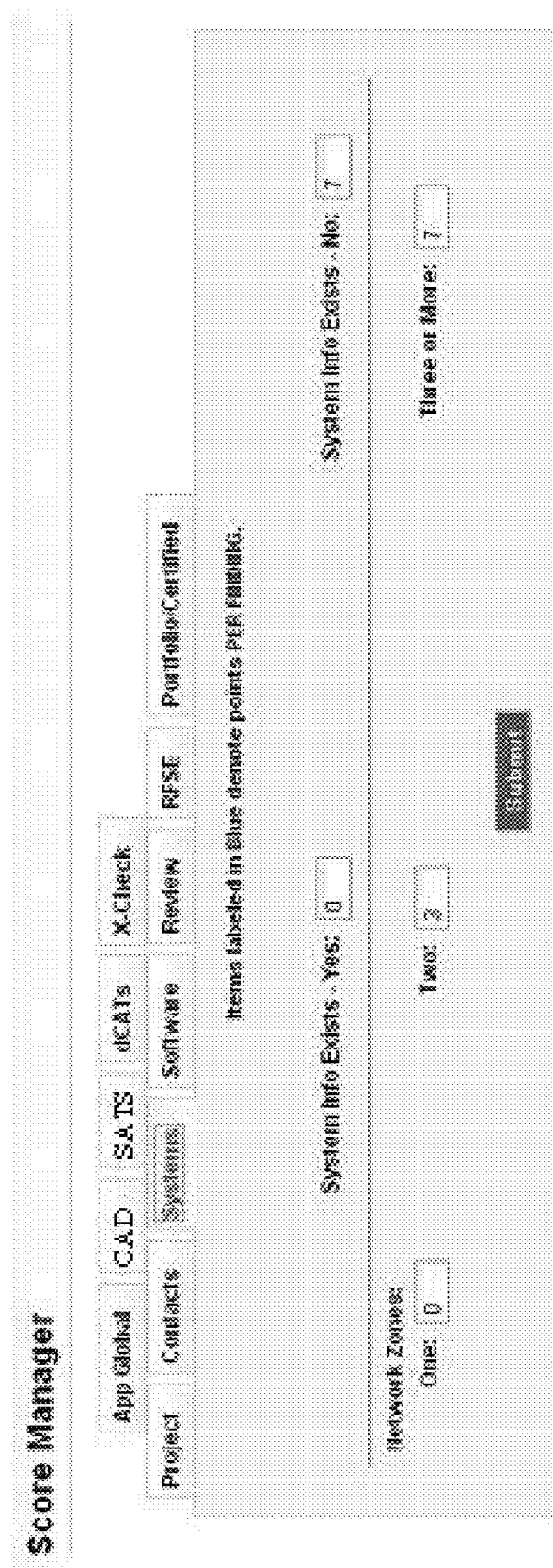
Figure 7A:
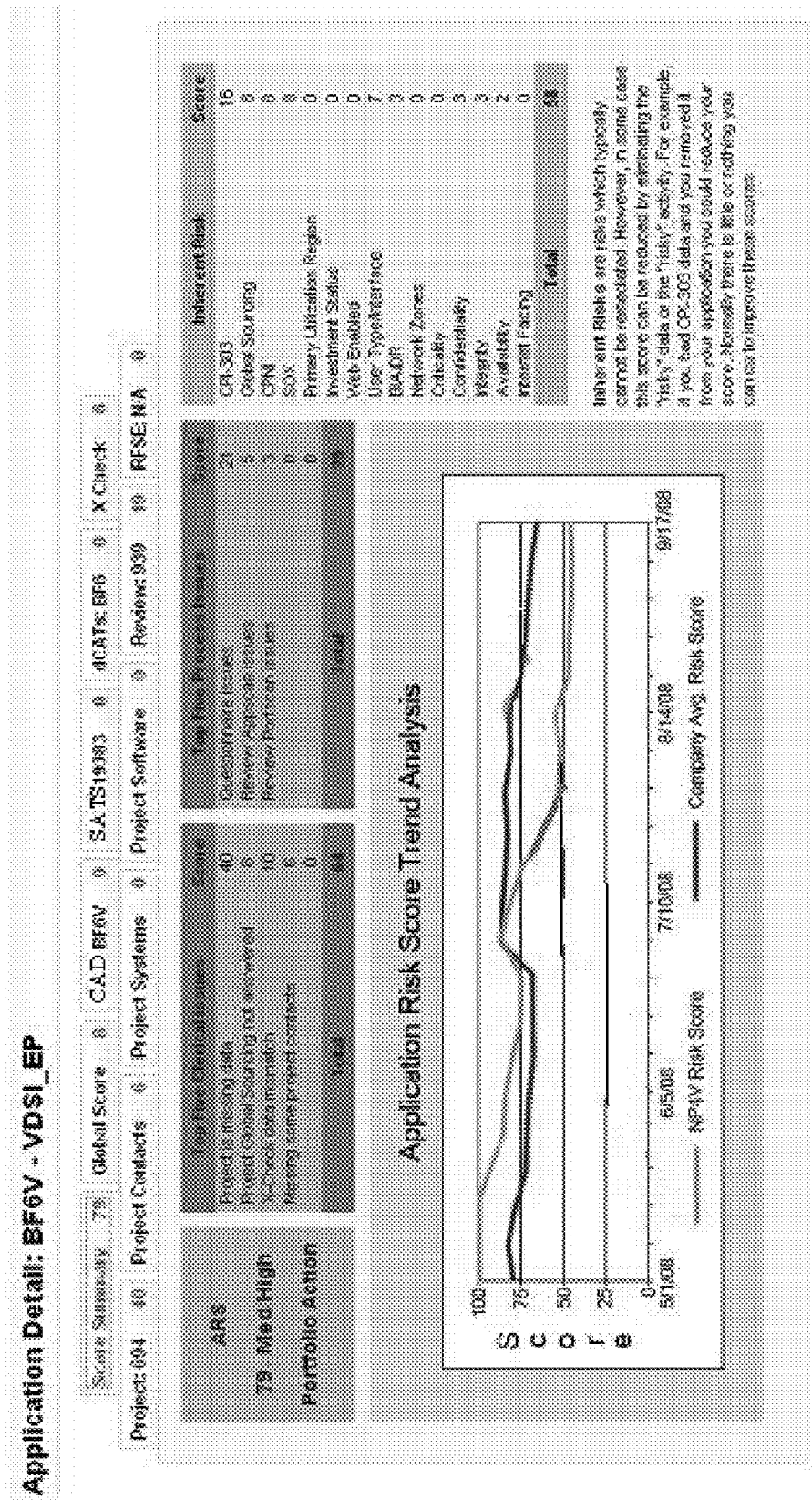
Figure 7B:
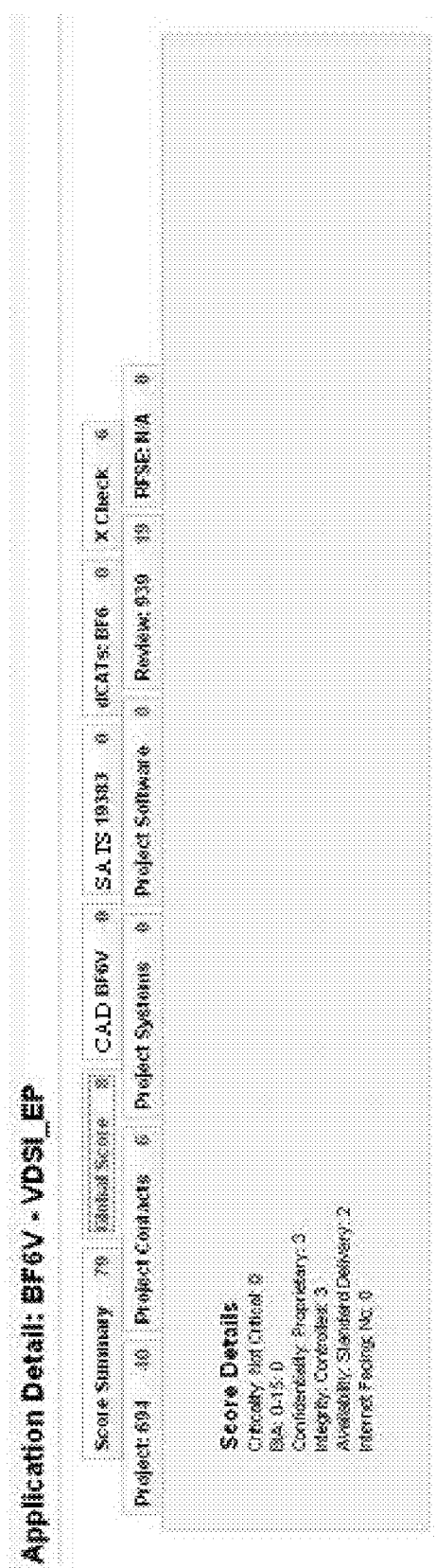
Figure 7F:
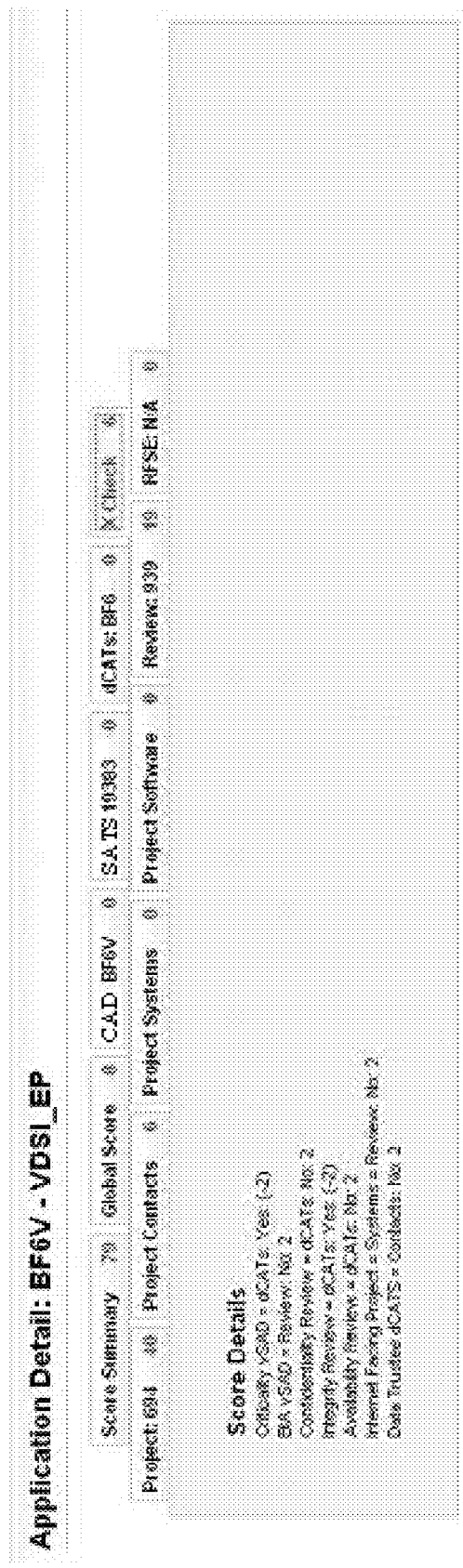

In one embodiment, if there is new application installed 305, the ASMP system may generate a security risk criterion intake form for the new application 310, as will be further illustrated in FIG. 4A. In one implementation, the ASMP may re-use an existing intake form for the new application if the new application is similar to an existing one. The ASMP system may proceed to obtain the latest available security data of applications within the monitored network 315, as will be further illustrated in FIG. 4B. In one embodiment, for every application 320, the ASMP may generate a risk factor matrix 330 based on the obtained security data, wherein the risk factor matrix contains a list of scores for different risk factors associated with the application, as will be further illustrated in FIG. 4C. The ASMP may then provide an evaluation score of the application based on the risk factor matrix 340, as will be further illustrated in FIG. 4D. In one embodiment, the ASMP may continue to evaluate a next application 345 and upon the completion, the ASMP may generate security review reports 350, as will be illustrated in FIG. 6M.

Figure 6I:
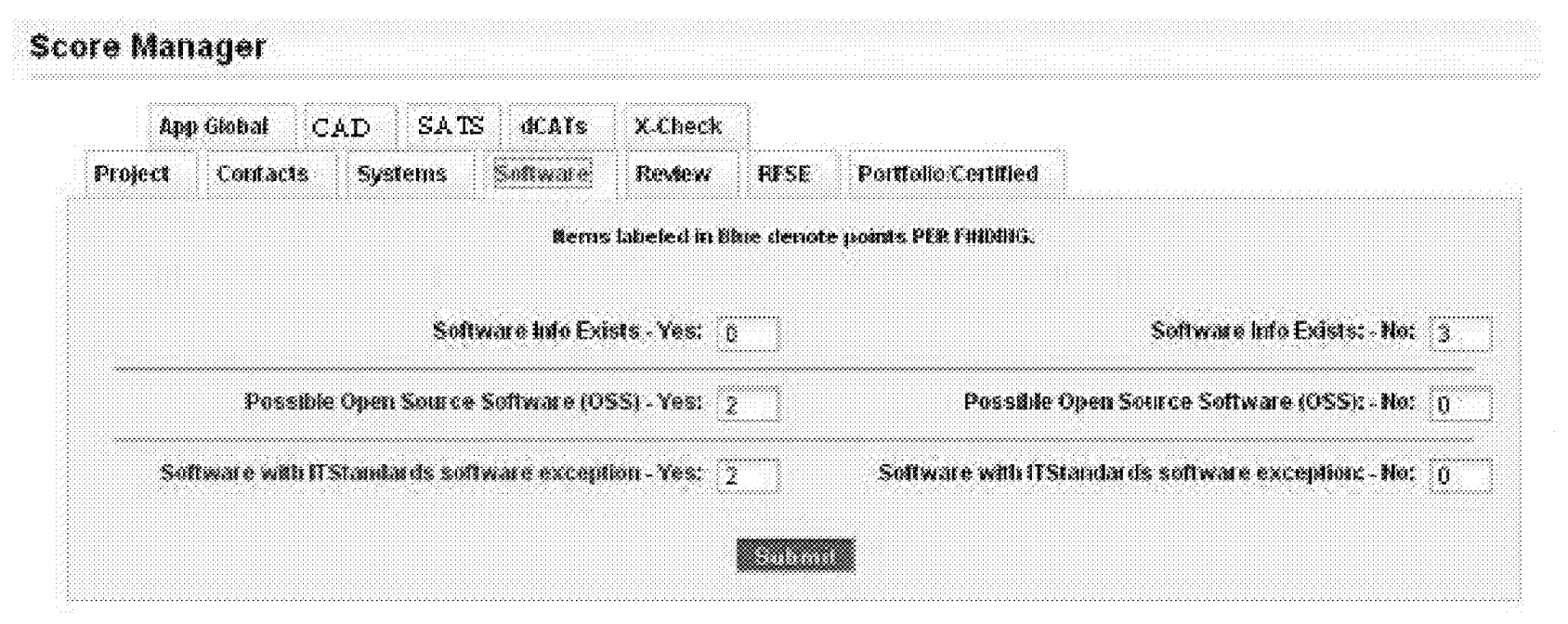
Figure 6K:
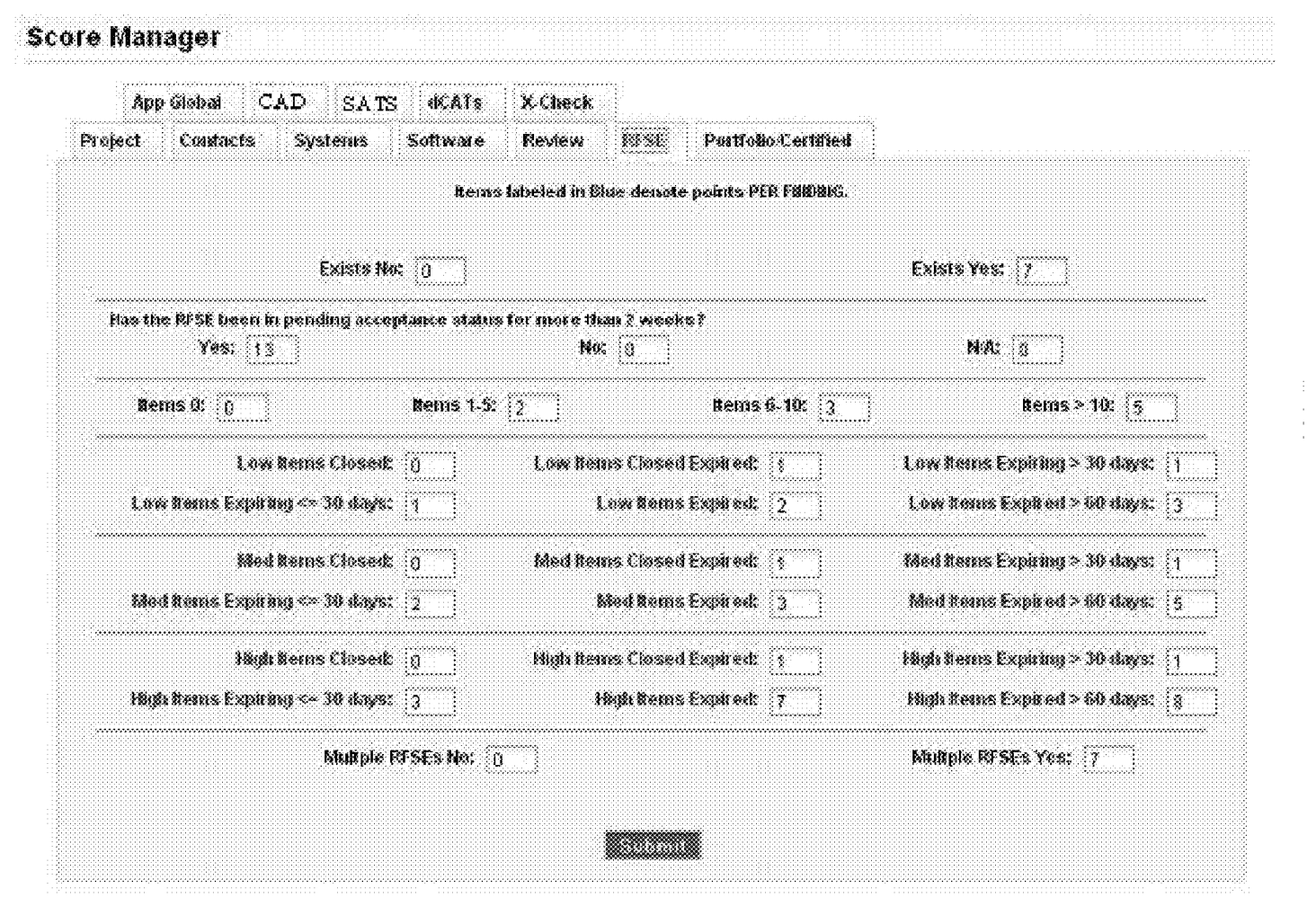
Figure 7L:
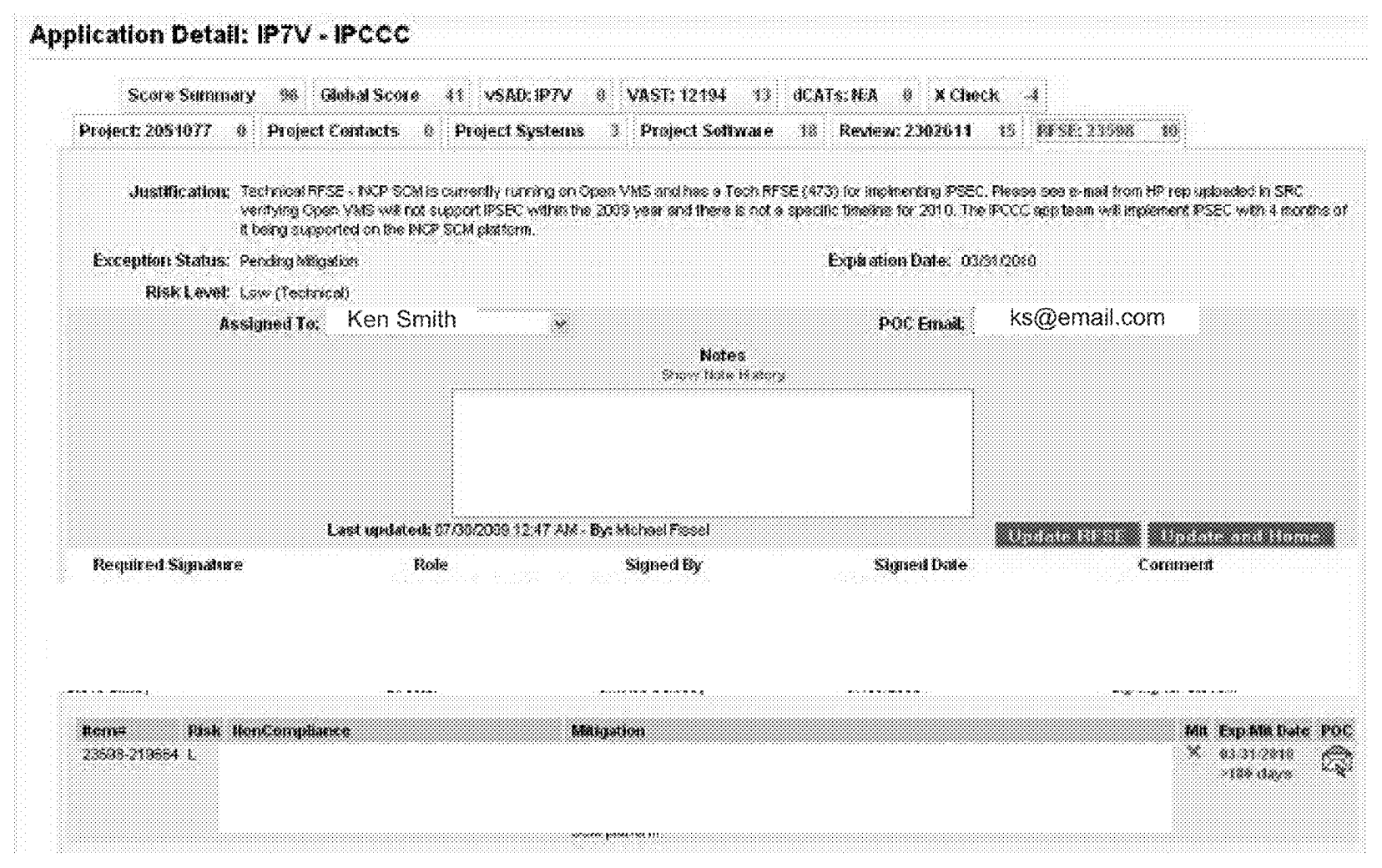

In one embodiment, the ASMP may analyze the security risk associated with an application based on its risk scores. For example, in one implementation, as shown in FIGS. 7A-L, the scoring of an application with ID "BF6V-VDS-I_EP" is illustrated in detail in different pages such as score summary, global score, CAD, SATS, dCATS, cross-check, project, contacts, systems, software, review, spyware check (RFSE), and/or the like. In FIG. 6A, the ASMP may plot and display an application score trend curve to illustrate the evolution of the risk score of any specific application within a time period, and compared to the overall average risk score of all applications.

Figure 8A:
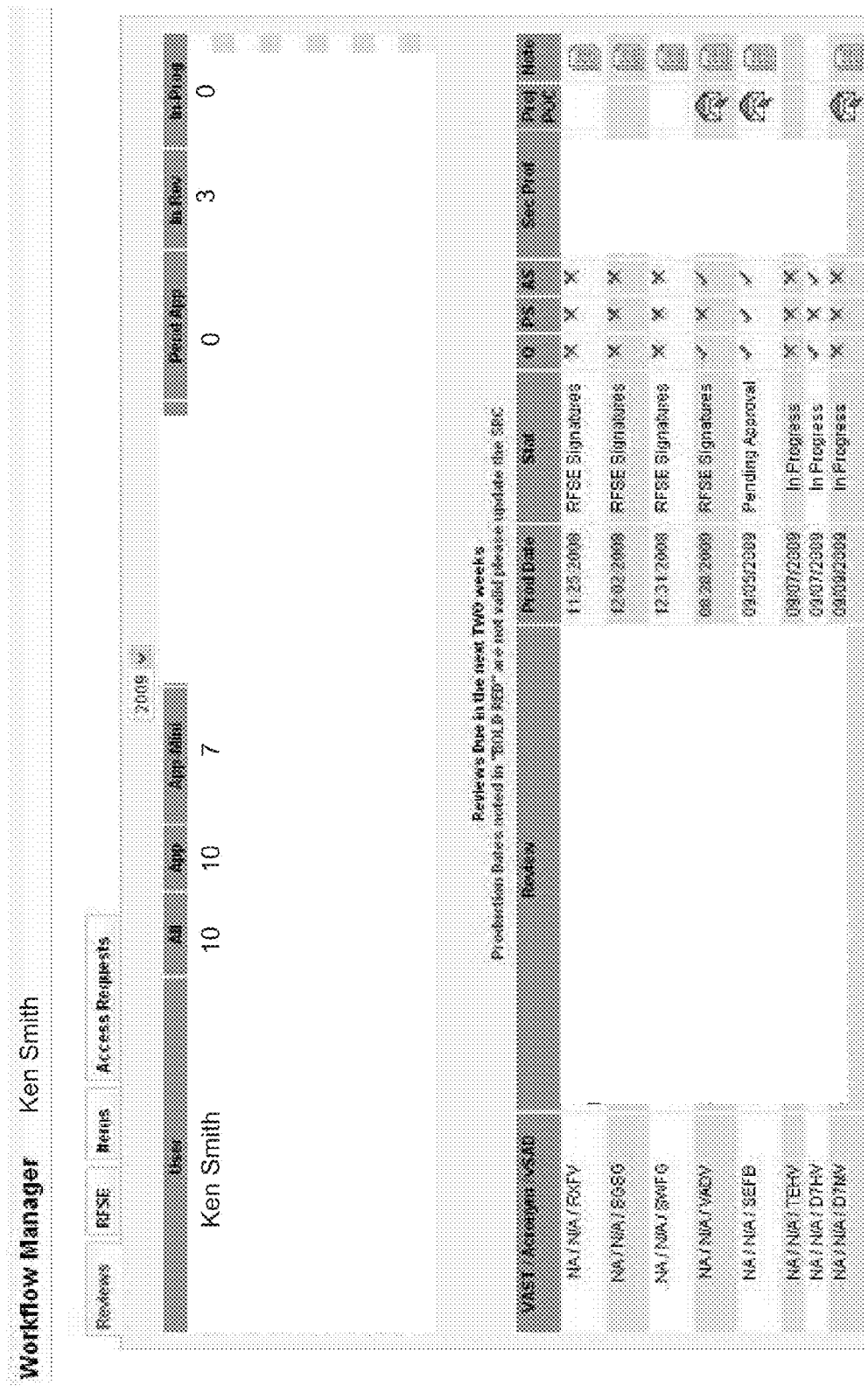
Figure 8C:
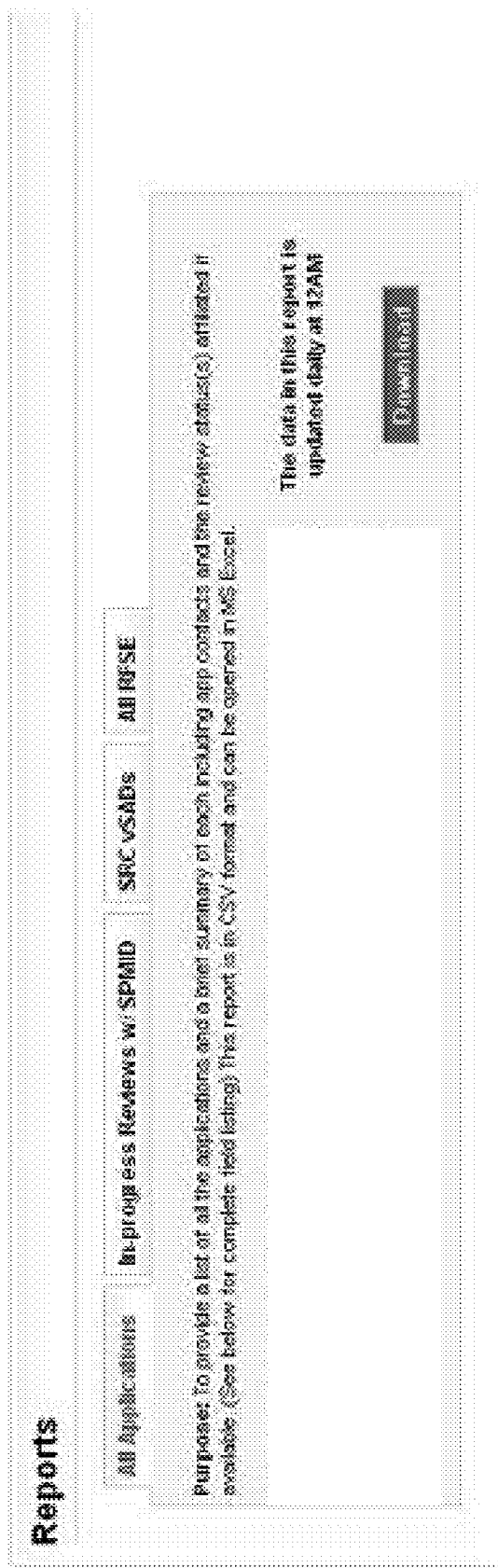

In one embodiment, the ASMP may present the application scoring results to a user for review via a user interface and manage the user review process 355. FIGS. 8A-C provide examples of user interface screenshots illustrating aspects of review process in one embodiment of ASMP operation. In FIG. 8A-B, a security professional may log in and view a page of work queue for reviews, including applications, access requests, RFSE and/or the like. In FIG. 8C, in one implementation, a report of application risk analysis is provided and a security professional may download it from the ASMP.

FIG. 4A shows a logic flow diagram illustrating generating a risk criterion intake form in one embodiment of aspects of ASMP operation. In one embodiment, the components of the application are assessed 402. In one implementation, the ASMP may receive assessment data of the application from a security professional. In another implementation, the ASMP may search for similar applications and retrieve assessment data of the similar applications. The ASMP may then determine security assessment criteria 405 based on the analysis, and generate an intake question form based on the determined security risk criteria 407. In one embodiment, the ASMP may associate the application type with the newly generated intake form 410 and store the intake form in the database 412.

Figure 4B:
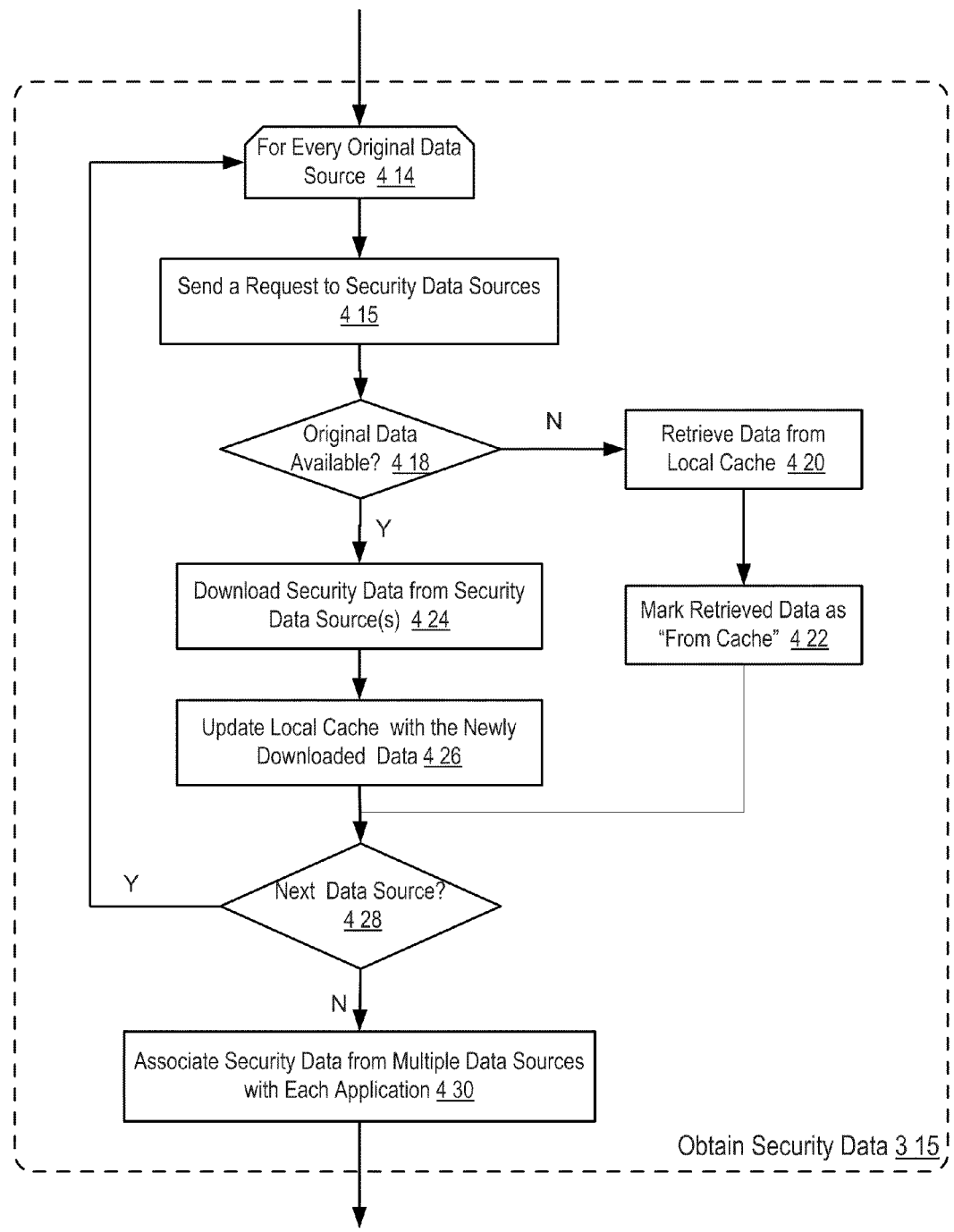

FIG. 4B shows a logic flow diagram illustrating obtaining security data from external data sources in one embodiment of aspects of ASMP operation. In one embodiment, for every original data source 414, the ASMP may send a request to download data 415. If the original data source is available 418, the ASMP may download security data from the data sources 424 and update stored local cache with the newly received data 426. For example, in one implementation, the security data may be obtained as CSV files, spreadsheets, XML and/or the like. In one embodiment, if the original data source is not available 415, for example, due to link failures, database exception, database maintenance and/or the like, the ASMP may retrieve local cached data from the ASMP database 420. In one implementation, the ASMP may mark the retrieved data as "from local cache" 422, and indicate it in the application reviews generated later on. The ASMP may then determine whether to proceed with next data source 428. Having collected security data from every original data source, the ASMP may associate obtained security data with each application 430. For example, in one implementation, the ASMP may form a query into the security data based on an application ID and associate the returned data items with the particular application ID.

Figure 4C:
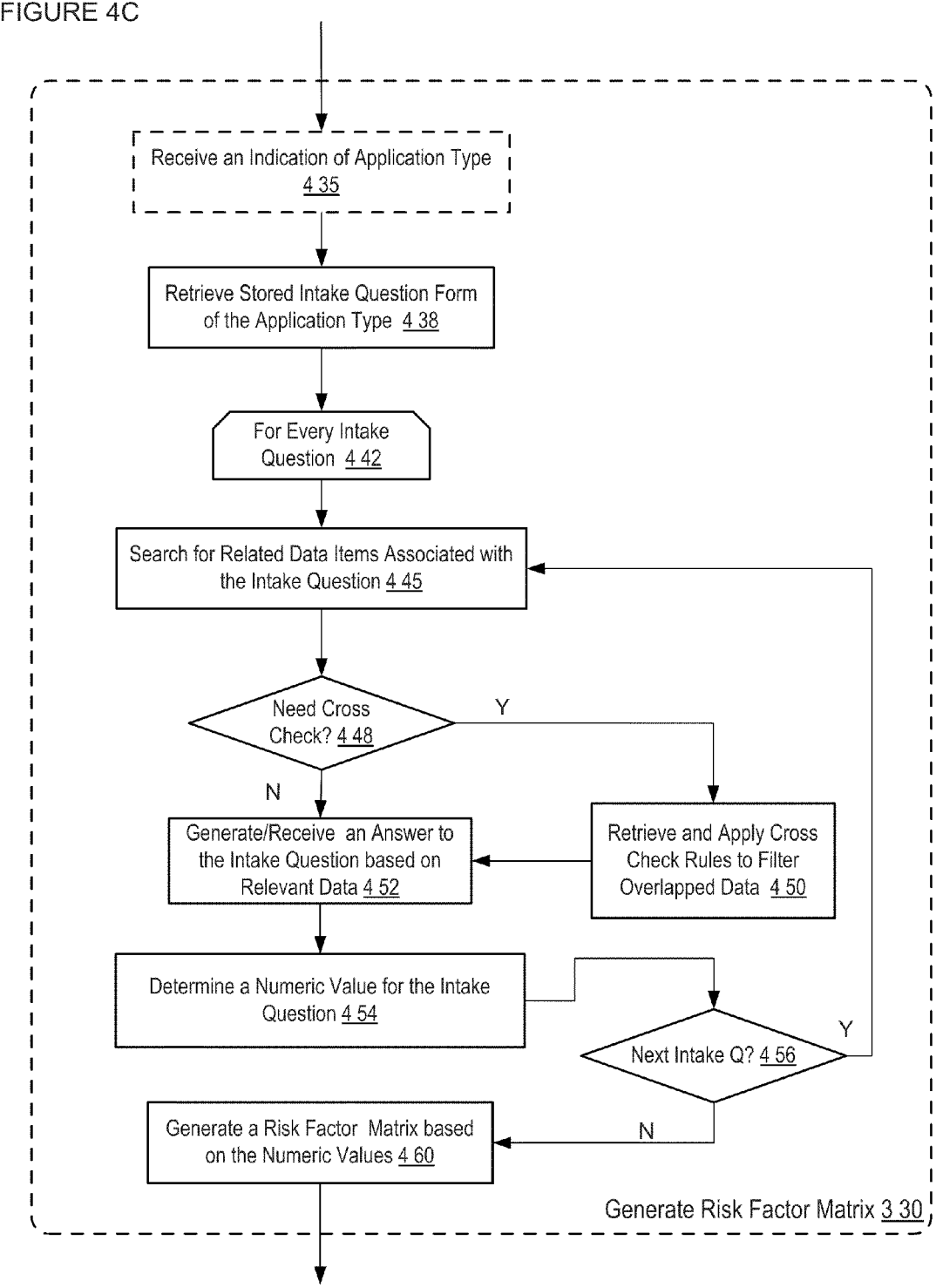

FIG. 4C shows a logic flow diagram illustrating generating a risk factor matrix for an application in one embodiment of aspects of ASMP operation. In one embodiment, for a particular application, the ASMP may receive an indication of application type 435 and retrieve stored intake question form of the Application type 438. For every intake question 442, the ASMP may search or related data items associated with the intake question 445. If the returned data item is an overlapped item of different data sources, the ASMP may process the data with cross check 448. In one implementation, the ASMP may retrieve and apply cross check agreement rules to filter the overlapped data item 450.

In one embodiment, based on the security data, the ASMP may generate/receive an answer to the intake question 450. For example, in one implementation, if the intake question is "Data Confidentiality Restricted?", the ASMP may form a query on the obtained security data based on "data confidentiality", and determine a positive answer to the intake question if the "data confidentiality" is "high." In another implementation, the ASMP may display the intake question to a user (security professional), for example, on a popup window on the screen, and the user may submit an answer to the question based on the knowledge of security data. In one embodiment, the ASMP may determine a numeric value for the intake question based on a predefined scoring mechanism. For example, in one implementation, if the answer to "Data Confidentiality Restricted" is "yes", then the corresponding risk factor "Data Confidentiality Restricted" may be scored as "7." In another implementation, the security professional may manually submit numeric scores to risk factors based on a raw score generated by the ASMP.

In one embodiment, the ASMP may proceed to score next intake question 456 until all intake questions have been scored 456. The ASMP may then generate a risk factor matrix based on the scores of intake questions 460. In one embodiment, the ASMP may generate a spreadsheet of risk factor matrix and the security professional may view/download it from a user interface, as illustrated in FIGS. 6A-6L. For example, in one implementation, a security professional may enter a score for each factor to generate a risk factor matrix. In one implementation, the risk scoring may be grouped into different pages such as application global, CAD, SATS, dCATS, cross-check, project, contacts, systems, software, review, spyware check (RFSE), portfolio certification and/or the like, as shown in FIG. 6A-6L, respectively.

Figure 4D:
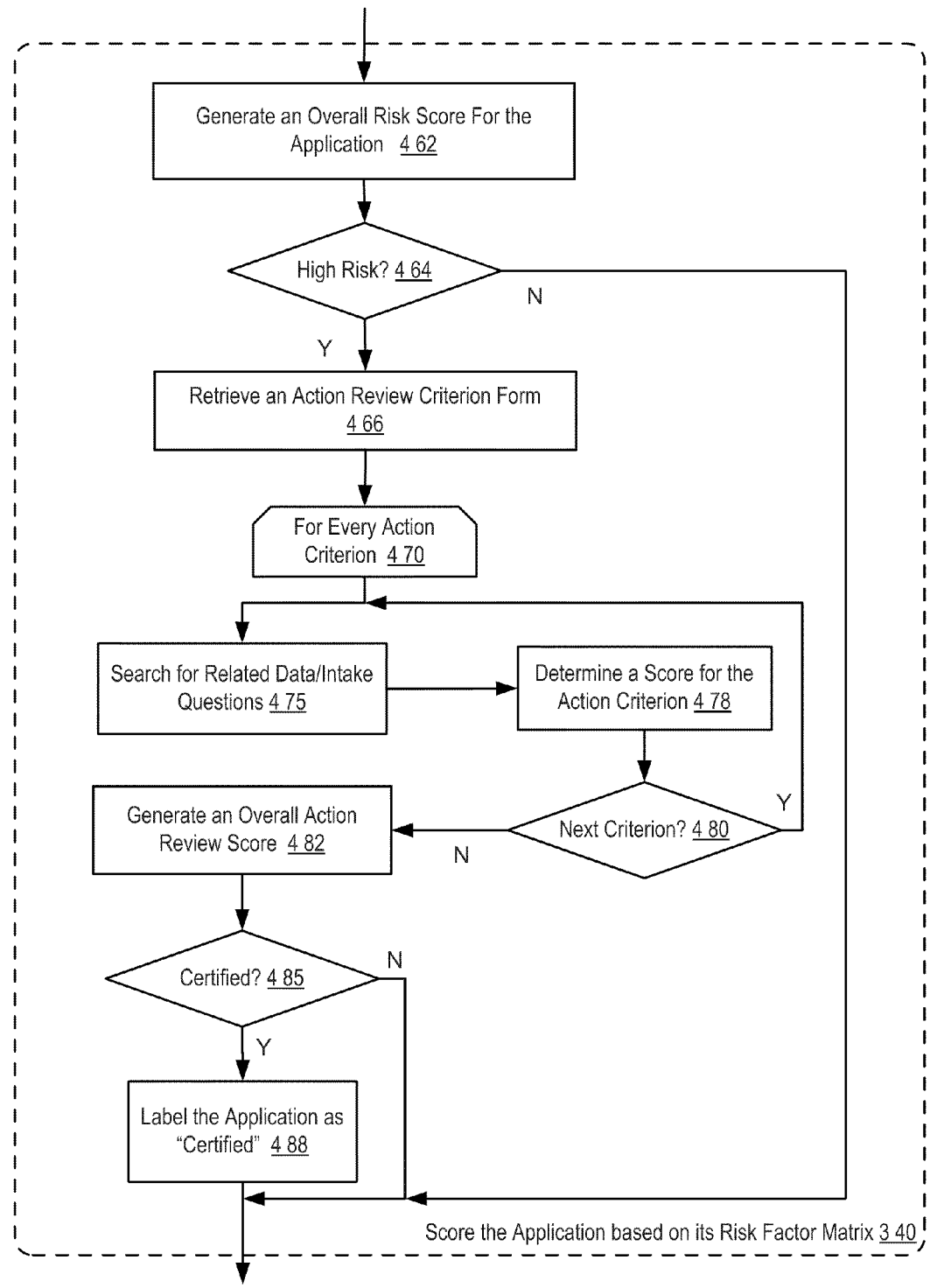

FIG. 4D shows a logic flow diagram illustrating scoring an application based on its risk factor matrix in one embodiment of aspects of ASMP operation. In one embodiment, the ASMP may generate an overall risk score for the application 462, for example, by summing up scores of each risk factor in the risk factor matrix. In one embodiment, the ASMP may determine whether the application is of high risk 464 based on the risk score. For example, in one implementation, if the overall score of an application is greater than a threshold (e.g. 100 in FIG. 6M or some other value), then the application is considered as of high risk. Otherwise, the application is considered low risk. Different modalities (e.g. very high-high-medium-low-very low, etc.) are of course within the scope of the invention. In another implementation, the threshold risk scores may be predetermined by a user and stored in a database for use in the illustrated process.

In one embodiment, the ASMP may classify the risk associated with the application as different levels by thresholds: negligible, low, med, med/high, high, and display the classification on a user interface, as shown in FIG. 6M. For example, in one implementation, an "Application Risk Dashboard" page may be shown on a user interface to provide risk analysis statistics of applications under different portfolios (e.g. business units, etc.), as shown in FIG. 6M.

In one embodiment, if the application is of high risk, the ASMP may retrieve an action review criterion form 466 and re-evaluate the application. In one implementation, the action review criteria may be determined by security professionals and stored in the ASMP database. In one embodiment, for every action criterion 470, the ASMP may search for related security data and/or intake question answers 475, based on which the ASMP may determine a score for the action criterion 478. In another implementation, the ASMP may display the action criterion review form to a security professional and the security professional may determine and submit the scores. In one embodiment, the ASMP may proceed to next action criterion 480 and iterate all criteria to generate an overall action review score 482. The ASMP may then determine whether the application is certified 485. For example, in one implementation, if the action review score is greater than 80, then the ASMP may label the application as "certified" 488 to indicate that the high-risk application has been analyzed to mitigate the risk. FIG. 6L further illustrates a user interface of the action review criterion form.

FIG. 9 of the present disclosure illustrates inventive aspects of an ASMP controller 901 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the ASMP controller 901 may be connected to and/or communicate with entities such as, but not limited to: one or more users from user input devices 911; peripheral devices 912; a cryptographic processor device 928; and/or a communications network 913.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ASMP controller 901 may be based on common computer systems that may comprise, but are not limited to, components such as: a computer systemization 902 connected to memory 929.

A computer systemization 902 may comprise a clock 930, central processing unit (CPU) 903, a read only memory (ROM) 906, a random access memory (RAM) 905, and/or an interface bus 907, and most frequently, although not necessarily, the foregoing are all interconnected and/or communicating through a system bus 904. Optionally, the computer systemization may be connected to an internal power source 986. Optionally, a cryptographic processor 926 and/or a global positioning system (GPS) component 975 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the ASMP controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the ASMP thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface bus(es) 907 may accept, connect, and/or communicate to a number of interface adapters, conventionally although not necessarily in the form of adapter cards, such as, but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/ or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the ASMP controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the ASMP controller may be embodied as an embedded, dedicated, and/or monitor-less (i.e., headless) device, wherein access would be provided over a network interface connection.

Cryptographic units such as, but not limited to, microcontrollers, crypto processors 926, interfaces 927, and/or devices 928 may be attached, and/or communicate with the ASMP controller. A MC68HC 16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Generally, any mechanization and/or embodiment allowing a processor to affect the storage and/or retrieval of information is regarded as memory 929. However, memory is a fungible technology and resource; thus, any number of memory embodiments may be employed in lieu of or in concert with one another. It is to be understood that the ASMP controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the ASMP component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

The operating system component 915 is an executable program component facilitating the operation of the ASMP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ASMP controller to communicate with other entities through a communications network 913. Various communication protocols may be used by the ASMP controller as a subcarrier transport mechanism for interaction, such as, but not limited to: multicast, TCP/IP, UDP, unicast, and/or the like.

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ASMP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ASMP database 919, operating systems, other program components, user interfaces, Web browsers, and/or the like.

Access to the ASMP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ASMP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ASMP as a query. Upon generating query results from the query, the results are passed over the bridge mechanism, and may be parsed for formatting and generation of a new result Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in entity of a Web browser and information server, a combined application may be developed to perform similar functions of both. The combined application would similarly affect the obtaining and the provision of information to users, user agents, and/or the like from the ASMP enabled nodes. The combined application may be nugatory on systems employing standard Web browsers.

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ASMP.

Access to the ASMP mail may be achieved through a number of APIs offered by the individual Web server components and/or the operating system.

Also, a mail server may contain, communicate, generate, obtain, and/or provide program component, system, user, and/or data communications, requests, information, and/or responses.

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ASMP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the ASMP component to engage in secure transactions if so desired. The cryptographic component facilitates the secure accessing of resources on the ASMP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ASMP database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ASMP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the ASMP database is implemented as a data-structure, the use of the ASMP database may be integrated into another component such as the ASMP component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-f*. A Users table 919*a* may include fields such as, but not limited to: user_ID, user_name, user_password, contact_info, hardware_ID, task_ID, task_history, user_evaluation and/or the like. A Hardware table 919*b* may include fields such as, but not limited to: hardware_ID, hardware_type, hardware_name, data_formatting_requirements, protocols, addressing_info, usage_history, hardware_requirements, user_ID, and/or the like. A Cache table 919*c* may include fields such as, but not limited to: cache_date, cache_source, cache_ID, cache_source_ID, cache_system_ID, cache_application_acronym, cache_trustee, cache_contact, and/or the like. An Agreement rule table 919*d* may include fields such as, but not limited to: rule_ID, rule_acronym, rule_sources, rule_data, rule_content, and/or the like. A Review 919*e* may include fields such as, but not limited to review_ID, review_date, review_assignment, review_system, review_application, and/or the like. A Score table 919*f* may include fields such as, but not limited to score_ID, score_intake, score_app, score_system, score_risk_factor, and/or the like. These tables may support and/or track multiple entity accounts on the ASMP controller.

In one embodiment, the ASMP database may interact with other database systems. For example, the ASMP may employ a distributed database system for queries and data access by search. In one implementation, the ASMP component may treat the combination of the ASMP database and an integrated data security layer database as a single database entity.

In one embodiment, user programs may contain various user interface primitives, which may serve to update the ASMP. Also, various accounts may require custom database tables depending upon the environments and the types of clients the ASMP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-c*. The ASMP may be configured to keep track of various settings, inputs, and parameters via database controllers.

The ASMP database may communicate to and/or with other components in a component collection, including itself, and/or facilities of the like. Most frequently, the ASMP database communicates with the ASMP component, other program components, and/or the like. The database may contain, retain, and provide information regarding other nodes and data.

The ASMP component 935 is a stored program component that is executed by a CPU. In one embodiment, the ASMP component incorporates any and/or all combinations of the aspects of the ASMP that was discussed in the previous figures. As such, the ASMP affects accessing, obtaining and the provision of information, services, transactions, and/or the like across various communications networks.

The ASMP component is configurable to access, calculate, engage, exchange, generate, identify, instruct, match, process, search, serve, store, and/or facilitate communication channels between ASMP components and/or affiliated entities, transmission of security related data between interfaces, functional modules and storage elements, and/or the like and use of the ASMP.

The ASMP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the ASMP server employs a cryptographic server to encrypt and decrypt communications. The ASMP component may communicate to and/or with other components in a component collection, including itself, and/or facilities of the like. Most frequently, the ASMP component communicates with the ASMP database, operating systems, other program components, and/or the like. The ASMP may contain, communicate, generate, obtain, and/or provide program component, system, user, and/or data communications, requests, and/or responses.

The structure and/or operation of any of the ASMP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ASMP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-enabled method, comprising:
   obtaining application security data from a plurality of data sources;
   identifying at least one intake question form based on the at least one application;
   associating the obtained data with at least one application;
   generating via a processor a risk factor matrix for the at least one application based on the obtained data and the at least one intake question form, wherein the at least one intake question form is a risk factor intake form and the generating comprises:
      retrieving the risk factor intake form from a database, the risk factor intake form comprising a plurality of risk factor questions,
      obtaining an answer, based on the obtained data, associated with each of the plurality of risk factor questions,
      converting the answer associated with each of the plurality of risk factor questions to a numerical score, and
      generating an entry of the risk factor matrix based on the risk factor question and the associated numerical score; and
   evaluating the at least one application based on the generated risk factor matrix.

2. The method of claim 1, wherein the plurality of data sources comprise an asset security tracking system.

3. The method of claim 1, wherein the application security data comprises application information, application security information and application trustee information.

4. The method of claim 1, wherein obtaining application security data from a plurality of data sources comprises:
   sending an access request to the plurality of data sources;
   if at least one of the plurality of data sources is available, receiving application security data from the at least one of the plurality of data sources, and updating a local cached copy of application security data in a database; and for those of the plurality of data sources that are not available to respond to the access request, retrieving the local cached copy of application security data corresponding to unavailable data sources from the database.

5. The method of claim 4 further comprising periodically synchronizing the local cached copy of application security data in the database with the plurality of data sources, wherein the period may be predefined by a user.

6. The method of claim 1, wherein associating the obtained data with at least one application further comprises automatic cross-check of overlapped data from different data sources via a processor.

7. The method of claim 6, wherein the cross-check comprises:
retrieving at least one agreement rule from a database;
applying the at least one agreement rule to the overlapped data from different data sources; and
determining values of the overlapped data based on one of the different data sources.

8. The method of claim 7, wherein the at least one agreement rule is predefined.

9. The method of claim 1, wherein generating a risk factor matrix for the at least one application based on the obtained data further comprises:
displaying the plurality of risk factor questions via a user interface to at least one user; and
receiving the answer to each of the plurality of risk factor questions from the at least one user.

10. The method of claim 9 further comprising generating a risk factor intake form for the at least one application if there does not exist a stored risk factor intake form associated with the at least one application.

11. The method of claim 10, wherein generating a risk factor intake form comprises:
assessing a plurality of components of the at least one application;
determining a plurality of security evaluation criteria associated with the at least one application based on the assessment;
determining a weighing factor associated with each security evaluation criterion;
generating a risk factor intake form containing a plurality of risk factor questions based on the determined plurality of security evaluation criteria; and
associating the generated risk factor intake form with a type of the at least one application.

12. The method of claim 10 further comprising:
receiving assessment data of the at least one application via a user interface from a user; and
receiving a plurality of security evaluation criteria associated with the at least one application via a user interface from a user.

13. The method of claim 1, wherein identifying at least one intake question form based on the at least one application further comprises:
identifying an application type based on the at least one application; and
identifying the at least one intake question form based on the application type.

14. An apparatus, comprising:
a processor;
a memory in communication with the processor and containing program instructions;
an input device and an output device both in communication with the processor and memory, said output device providing a user interface;
wherein the processor executes program instructions contained in the memory and the program instructions cause the processor to:
obtain application security data from a plurality of data sources;
associate the obtained data with at least one application program;
identify at least one intake question form based on the at least one application program;
generate a risk factor matrix for the at least one application based on the obtained data and the at least one intake question form by:
retrieving the risk factor intake form from a database, the risk factor intake form comprising a plurality of risk factor questions,
obtaining an answer, based on the obtained data, associated with each of the plurality of risk factor questions,
converting the answer associated with each of the plurality of risk factor questions to a numerical score, and
generating an entry of the risk factor matrix based on the risk factor question and the associated numerical score;
evaluate the application program based on the generated risk factor matrix; and
output an application security report.

15. The apparatus of 14, wherein evaluating the at least one application based on the generated risk factor matrix comprises:
generating a general risk score for the at least one application based on the risk factor matrix;
determining a risk level associated with the at least one application based on the general risk score; and
if the determined risk level is high, retrieving an action review form from a database,
generating a second score of the at least one application based on the action review form,
if the second score of the at least one application is lower than an action review threshold, labeling the at least one application as certified.

16. The apparatus of claim 15, wherein the action review form is generated in association with the risk factor intake form.

17. The apparatus of claim 15, wherein the action review threshold is predefined.

18. A non-transitory processor readable medium, comprising:
processor readable instructions stored in the processor readable medium, wherein the processor readable instructions are executable by a processor to:
obtain application security data from a plurality of data sources;
associate the obtained data with at least one application program;
identify at least one intake question form based on the at least one application program;
generate a risk factor matrix for the application based on the obtained data and the at least one intake question form by:
retrieving the risk factor intake form from a database, the risk factor intake form comprising a plurality of risk factor questions,
obtaining an answer, based on the obtained data, associated with each of the plurality of risk factor questions, converting the answer associated with each of the plurality of risk factor questions to a numerical score, and generating an entry of the risk factor matrix based on the risk factor question and the associated numerical score; and evaluate the application program based on the generated risk factor matrix.

19. The medium of claim 18, wherein the processor readable instructions are further executable by the processor to:

generate at least one review report of the at least one application based on the risk factor matrix and the evaluation.

20. The medium of claim 18, wherein the processor readable instructions are further executable by the processor to:

analyze a risk score trend of an application; and display the analysis to a user.

21. The medium of claim 18, wherein the processor readable instructions are further executable by the processor to:

maintain a work queue of review tasks for a user; and display a list of review tasks in the work queue in a sequential order via a user interface to the user.

* * * * *